(12) United States Patent
Hirose et al.

(10) Patent No.: US 9,634,330 B2
(45) Date of Patent: Apr. 25, 2017

(54) ANODE AND SECONDARY BATTERY

(75) Inventors: Takakazu Hirose, Fukushima (JP);
Kenichi Kawase, Fukushima (JP);
Tomoo Takada, Fukushima (JP);
Kazunori Noguchi, Fukushima (JP);
Takayuki Fujii, Fukushima (JP)

(73) Assignee: SONY CORPORATION, Tokyo (JP)

( * ) Notice: Subject to any disclaimer, the term of this patent is extended or adjusted under 35 U.S.C. 154(b) by 580 days.

(21) Appl. No.: 12/428,518

(22) Filed: Apr. 23, 2009

(65) Prior Publication Data

US 2009/0269677 A1 Oct. 29, 2009

(30) Foreign Application Priority Data

Apr. 23, 2008 (JP) ................................ 2008-112661

(51) Int. Cl.
*H01M 4/134* (2010.01)
*H01M 4/62* (2006.01)
(Continued)

(52) U.S. Cl.
CPC ............ *H01M 4/624* (2013.01); *H01M 4/134* (2013.01); *H01M 4/621* (2013.01); *H01M 4/626* (2013.01);
(Continued)

(58) Field of Classification Search
CPC ........ H01M 4/805; H01M 4/134; H01M 4/82; H01M 4/84; H01M 4/661
(Continued)

(56) References Cited

U.S. PATENT DOCUMENTS 5,080,963 A * 1/1992 Tatarchuk et al. ............ 442/343
2002/0168574 A1* 11/2002 Ahn et al. ..................... 429/232
(Continued)

FOREIGN PATENT DOCUMENTS

JP 08-273660 10/1996
JP HEI 11-233116 A 8/1999
(Continued)

OTHER PUBLICATIONS

Yamada et al. JP-2004-071305. Non-aqueous electrolyte rechargeable battery. Mar. 4, 2004. English machine translation provided by JPO.*

(Continued)

*Primary Examiner* — James Lee
(74) *Attorney, Agent, or Firm* — Dentons US LLP

(57) ABSTRACT

A secondary battery capable of improving the cycle characteristics is provided. The secondary battery includes a cathode, an anode, and an electrolytic solution. The electrolytic solution is impregnated in a separator provided between the cathode and the anode. The anode has an anode structure on an anode current collector. The anode structure has a structure in which a plurality of anode active material particles having silicon are held by a plurality of metal fibers forming a three-dimensional network structure. Due to the plurality of metal fibers, sufficient conductive paths are obtained among the plurality of anode active material particles. Thus, compared to a general anode in which an active material layer is provided on a current collector made of a metal foil or the like, the current collectivity is improved.

19 Claims, 12 Drawing Sheets

(51) Int. Cl.
*H01M 10/0525* (2010.01)
*H01M 10/0569* (2010.01)
*H01M 10/0587* (2010.01)

(52) U.S. Cl.
CPC ... *H01M 10/0525* (2013.01); *H01M 10/0569* (2013.01); *H01M 10/0587* (2013.01); *H01M 2300/0037* (2013.01)

(58) Field of Classification Search
USPC .................................................. 429/121–347
See application file for complete search history.

(56) References Cited

U.S. PATENT DOCUMENTS

| | | | | |
|---|---|---|---|---|
| 2004/0170895 | A1* | 9/2004 | Takeuchi et al. | 429/218.1 |
| 2006/0269845 | A1* | 11/2006 | Xu et al. | 429/326 |
| 2007/0020523 | A1* | 1/2007 | Kawase et al. | 429/218.1 |
| 2007/0243469 | A1* | 10/2007 | Kim et al. | 429/232 |

FOREIGN PATENT DOCUMENTS

| | | | | |
|---|---|---|---|---|
| JP | 2000-003730 | | 1/2000 | |
| JP | 2003-168426 | | 6/2003 | |
| JP | 2003-308831 | A | 10/2003 | |
| JP | 2004-071305 | * | 3/2004 | ........... H01M 10/40 |
| JP | 2004-259636 | A | 9/2004 | |
| JP | 2004-288520 | A | 10/2004 | |
| JP | 2005-116509 | A | 4/2005 | |
| JP | 2005-150117 | A | 6/2005 | |
| JP | 2007-027008 | A | 2/2007 | |
| JP | 2008-077993 | A | 4/2008 | |
| JP | 2009-176550 | A | 8/2009 | |
| JP | 2009-199744 | A | 9/2009 | |

OTHER PUBLICATIONS

Japanese Patent Office, Office Action issued in Patent Application Jp 2008-112661, on Oct. 19, 2010.

* cited by examiner

ANODE AND SECONDARY BATTERY

BACKGROUND OF THE INVENTION

1. Field of the Invention

The present invention relates to an anode containing a plurality of anode active material particles and a secondary battery including the anode.

2. Description of the Related Art

In recent years, portable electronic devices such as video cameras, mobile phones, and notebook personal computers have been widely used, and it is strongly demanded to reduce their size and weight and to achieve their long life. Accordingly, as an electric power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery is able to provide a higher energy density than a lead battery and a nickel cadmium battery. The lithium ion secondary battery includes a cathode, an anode, and an electrolytic solution. The anode has an anode active material layer on an anode current collector.

As an anode active material contained in the anode active material layer, a carbon material such as graphite has been widely used. However, in recent years, as the high performance and the multi functions of the portable electronic devices are developed, further improvement of the battery capacity is demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved. In this case, not only the simple substance of silicon, but also a compound, an alloy and the like of silicon are used.

However, in the case where silicon powder is used as an anode active material, a low conductive material such as an SEI (Solid Electrolyte Interface) film is deposited on the surface of silicon particles when charge and discharge are repeated. The low conductive material becomes an electric resistance and accordingly becomes a factor to lose activity of the silicon particles. Thereby, sufficient cycle characteristics are difficult to be obtained.

Accordingly, to improve the cycle characteristics even in the case of using silicon as an anode active material, various innovations have been made. Specifically, for example, a technique of forming a silicon compound on a carbon fiber disclosed in Japanese Unexamined Patent Application Publication No. 08-273660, a technique of using a metal fiber as an electrical conductor together with a silicon compound disclosed in Japanese Unexamined Patent Application Publication No. 2000-003730, a technique of covering the surface of fibrous silicon with a carbon material disclosed in Japanese Unexamined Patent Application Publication No. 2003-168426, a technique of providing an active material layer containing silicon on a fibrous conducive base material disclosed in Japanese Unexamined Patent Application Publication No. 2007-128724 and the like are known.

In addition, as a technique regarding an electrode structure, a method of manufacturing a three-dimensional network electrode using a porous resin disclosed in, for example, Japanese Unexamined Patent Application Publication Nos. 57-174484, 08-222226, and 08-225865 is also known. In this technique, after a metal film or the like is formed on the skeleton surface of the porous resin, the porous resin is removed by heating to form the three-dimensional network structure.

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics are easily lowered. In such circumstances, to address recent demand for sufficient cycle characteristics of the secondary battery, it is difficult to obtain the sufficient cycle characteristics only by using an electrical conductor. Therefore, further improvement of the cycle characteristics of the secondary battery has been aspired.

In view of the foregoing, in the invention, it is desirable to provide an anode and a secondary battery capable of improving the cycle characteristics.

According to an embodiment of the invention, there is provided an anode that containing a plurality of metal fibers forming a three-dimensional network structure and a plurality of anode active material particles having silicon.

According to an embodiment of the invention, there is provided a secondary battery including a cathode, an anode, and an electrolytic solution, in which the anode contains a plurality of metal fibers forming a three-dimensional network structure and a plurality of anode active material particles having silicon.

The anode of the embodiment of the invention contains the plurality of metal fibers forming the three-dimensional network structure and the plurality of anode active material particles having silicon. Thus, due to the plurality of metal fibers, sufficient conductive paths are obtained among the plurality of anode active material particles. Thus, compared to a general anode in which an active material layer is provided on a current collector made of a metal foil or the like, the current collectivity is improved. Thereby, according to the secondary battery including the anode of the embodiment of the invention, the cycle characteristics are able to be improved.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
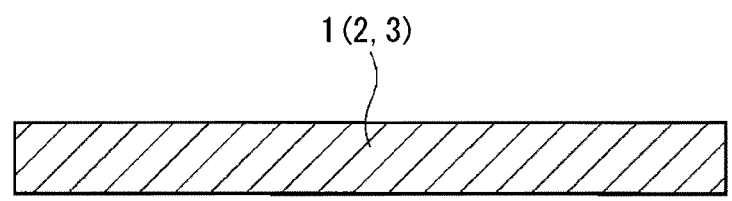
FIG. 1 is a cross sectional view illustrating a structure of an anode according to an embodiment of the invention.
Figure 2:
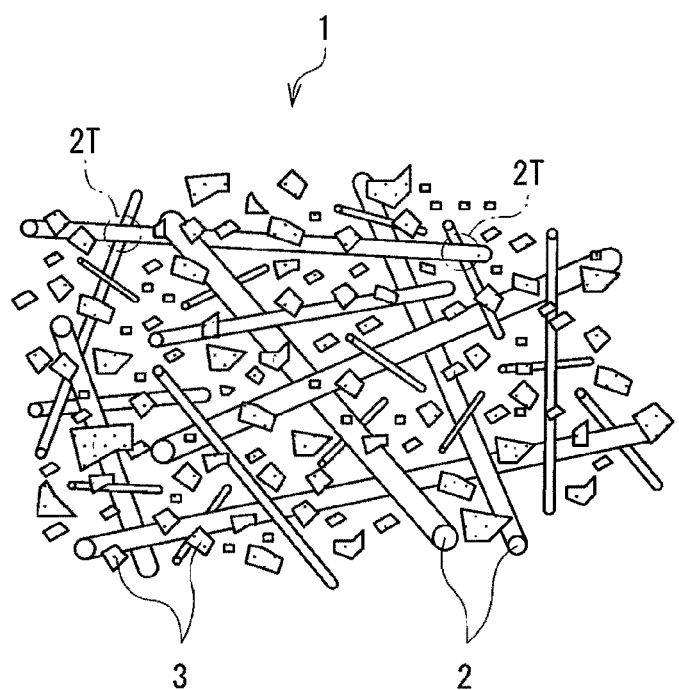
FIG. 2 is a cross sectional view schematically illustrating an enlarged part of the anode illustrated in FIG. 1.

FIG. 1 illustrates a cross sectional structure of an anode according to an embodiment of the invention. FIG. 2 schematically illustrates an enlarged part of the anode illustrated in FIG. 1.

The anode is used, for example, for an electrochemical device such as a secondary battery. As illustrated in FIG. 1, the anode is composed of an anode structure 1 containing a plurality of metal fibers 2 and a plurality of anode active material particles 3. Compared to a general anode in which an active material layer is provided on a current collector made of a metal foil or the like, the anode structure 1 corresponds to only the active material layer. In the case where the anode is, for example, applied to a secondary battery including a spirally wound electrode body in which a cathode and an anode are layered and spirally wound, the anode has a strip-shaped structure extending in one direction.

As illustrated in FIG. 2, in the anode structure 1, the plurality of metal fibers 2 form a three-dimensional network structure. The plurality of anode active material particles 3 are held by the plurality of metal fibers 2. That is, the plurality of metal fibers 2 play a role as a framework (base) to form the outer shape of the anode structure 1. The plurality of anode active material particles 3 are supported by the framework. Further, the plurality of anode active material particles 3 have silicon as an element. In some cases, the plurality of metal fibers 2 directly support the plurality of anode active material particles 3, and in some cases, the plurality of metal fibers 2 indirectly support the plurality of anode active material particles 3 with the aftermentioned anode binder or the like in between. In this case, the anode active material particles 3 are preferably contacted with the metal fibers 2.

The plurality of metal fibers 2 are connected to each other at least partially, and thereby forming the three-dimensional network structure. The foregoing "three-dimensional network structure" is a space structure formed from three dimensional connection among the plurality of metal fibers 2 at one or more connecting points 2T. The number of the connecting points 2T belonging to one metal fiber 2 may be 1 or more. As evidenced by the foregoing words "the plurality of metal fibers 2 are connected to each other at least partially," some of the plurality of metal fibers 2 may exist not being connected to other metal fibers 2 but being separated from other metal fibers 2.

In the anode, the plurality of metal fibers 2 forming the three-dimensional network structure play a role as a so-called current collector. Thus, differently from a general anode in which an active material layer is provided on a current collector, the current collector is not necessitated. FIG. 1 and FIG. 2 illustrate, for example, a case not necessitating the current collector.

The anode is composed of the anode structure 1 containing the foregoing plurality of metal fibers 2 and the foregoing plurality of anode active material particles 3. Accordingly, the plurality of metal fibers 2 function as a conductive path among the plurality of anode active material particles 3 and thereby sufficient conductive paths are obtained among the plurality of anode active material particles 3. As a result, compared to the foregoing general anode, current collectivity is largely improved. Further, the thickness of the anode is reduced by a portion obtained by omitting the separately provided current collector. Therefore, in the case where the anode is applied to the foregoing secondary battery including the spirally wound electrode body, the number of spirally winding thereof is able to be increased.

At least part of the plurality of anode active material particles 3 is preferably contained in the three-dimensional network structure formed from the plurality of metal fibers 2. Thereby, the current collectivity is further improved. In this case, it is preferable that major part of the plurality of anode active material particles 3 is contained in the three-dimensional network structure and the rest thereof is located on the surface of the three-dimensional network structure or in the vicinity thereof.

The metal fiber 2 is a fibrous metal material. The metal fibers 2 may straightly extend in a certain direction, may be curved in the middle course, may be bent, or these states may be mixed. In this case, the metal fibers 2 may be intertwined with each other. As the entire plurality of metal fibers 2, the larger number of the connecting points 2T is preferable, because the current collectivity of the anode is further improved.

The metal fiber 2 is composed of one or more metal materials. Examples of metal materials include at least one selected from the group consisting of titanium, iron, stainless, copper, aluminum, zinc, silver, cobalt, nickel, and chromium. Specially, titanium, iron, stainless, cobalt, nickel, or chromium is preferable, since such a material has superior electric conductivity and superior strength, and thereby the current collectivity of the anode is further improved.

In particular, the metal material composing the metal fibers 2 is preferably a metal material not forming an intermetallic compound with an electrode reactant. In the case where the intermetallic compound is formed with the electrode reactant, in operating an electrochemical device (for example, in charging and discharging a secondary battery), easily being influenced by a stress due to expansion and shrinkage of the anode active material particles 3, current collectivity may be lowered, or the anode active material particles 3 may be dropped from the metal fibers 2.

Figure 3A:
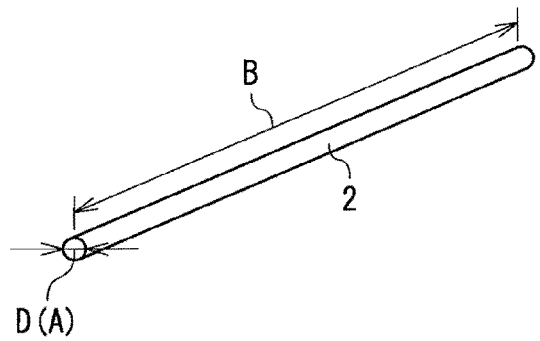
FIGS. 3A and 3B are views for explaining structural parameters of the metal fibers illustrated in FIG. 2.
Figure 3B:
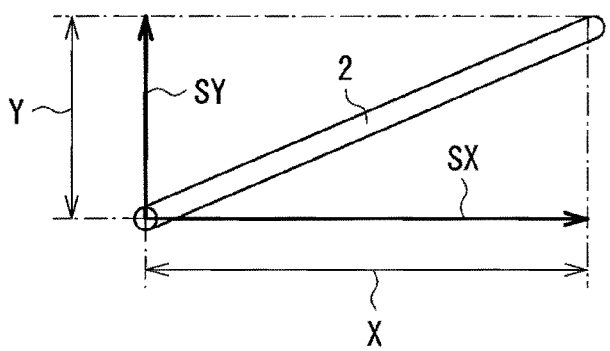

FIGS. 3A and 3B illustrate an enlarged view of one of the plurality of metal fibers 2 illustrated in FIG. 2. Structural parameters such as a diameter and a length of the metal fibers 2 are not particularly limited. However, to more improve the current collectivity of the anode, the structural parameters are preferably in the following range. As the structural parameters, FIG. 3A illustrates diameter D, average cross sectional diameter A, and average length B, and FIG. 3B illustrates dimensions X and Y.

The diameter D of the metal fiber 2 is preferably from 0.5 µm to 50 µm both inclusive. In the case where the diameter D is smaller than 0.5 µm, the strength of the metal fiber 2 is lowered, and thus the metal fiber 2 may be cut if external force is applied to the anode. In the case where the diameter D is larger than 50 µm, though the current collectivity of the anode is rarely changed, only the thickness of the anode may be increased. In particular, to decrease the thickness of the anode while a sufficient strength is obtained, the diameter D is preferably from 1 µm to 15 µm both inclusive, and more preferably from 2 µm to 10 µm both inclusive. In the case where the diameter D varies according to a position in the extending direction of the metal fiber 2, the foregoing lower limit (0.5 µm or more) is applied as the minimum diameter portion, and the foregoing upper limit (50 µm or less) is applied as the maximum diameter portion. Similarly, in the case where the cross sectional shape of the metal fiber 2 is not a perfect circle, the foregoing lower limit (0.5 µm or more) is applied as the minimum diameter portion, and the foregoing lower limit (50 µm or less) is applied as the maximum diameter portion.

Ratio B/A between the average cross sectional diameter A and the average length B of the metal fiber 2 (hereinafter abbreviated as "ratio B/A") is preferably 2 or more. That is, the metal fiber 2 is more preferably in a state of a sufficiently long cord (columnar) than in a state of an approximate particle having an excessively short length. In the case where the ratio B/A is smaller than 2, the number of the connecting points 2T becomes small and thus sufficient current collectivity may be difficult to obtain. The average cross sectional diameter A means an average value of maximum diameters D of 100 pcs of the metal fibers 2 selected at random. The average length B means an average value of lengths of 100 pcs of the metal fibers 2 selected at random.

When the metal fiber 2 is viewed in a cross section along the extending direction of the anode (horizontal direction in FIG. 1: hereinafter referred to as "anode extending direction"), and the metal fiber 2 is divided into component SX in the anode extending direction (horizontal direction in FIG. 3B) and component SY in a direction orthogonal to the anode extending direction (vertical direction in FIG. 3B), ratio Y/X between the dimension X of the component SX and the dimension Y of the component SY (hereinafter abbreviated as "ratio Y/X") is preferably 1 or less. Thereby, the metal fiber 2 extends approximately along the anode extending direction, and thus the number of the connecting points 2T in such a direction becomes large. Thereby, the conductive path is secured in the anode extending direction, and thus the anode is less likely to be short-circuited in such a direction. The ratio Y/X may be determined, for example, by observing a cross section along the anode extending direction with the use of a scanning electron microscope (SEM) or the like.

The plurality of metal fibers 2 preferably form a sheet. If the plurality of metal fibers 2 previously form the sheet, the sheet is able to be directly used as a component of the anode (for example, for a usage necessitating a thin structure).

The thickness of the foregoing sheet is preferably from 10 µm to 200 µm both inclusive. In the case where the thickness is smaller than 10 nm, the anode is excessively thin and thus may be broken. Meanwhile, in the case where the thickness is larger than 200 nm, the anode is excessively thick and thus the electric performance of an electrochemical device (for example, a battery capacity of a secondary battery or the like) may be lowered.

Further, the porosity of the sheet is preferably 20% to 95% both inclusive. In the case where the porosity is smaller than 20%, a space to contain the anode active material particles 3 is decreased, and thus the electric performance of an electrochemical device may be lowered. Meanwhile, in the case where the porosity is larger than 95%, it may be difficult to keep the sheet-like structure. In particular, the porosity is preferably as small as possible in the foregoing range. Thereby, the apparent amount of the metal fibers 2 to the anode active material particles 3 is increased, and thus the electric conductivity per 1 particle is increased. The porosity is the cubic capacity ratio occupied by the voids in the cubic volume of the entire sheet.

Further, the tensile strength of the sheet is preferably 0.1 N/mm or more, and more preferably from 0.1 N/mm to 168 N/mm both inclusive. In the case where the tensile strength is smaller than 0.1 N/mm, the anode may be easily broken in electrode reaction. Meanwhile, in the case where the tensile strength is larger than 168 N/mm, the space containing the anode active material particles 3 is decreased, and thus the electric performance of an electrochemical device may be lowered. The definition of the tensile strength (measurement conditions and the like) is based on JIS P8113.

The anode active material particles 3 contain one or more anode materials capable of inserting and extracting an electrode reactant, and the anode material contains a material having silicon as an element. Such a material has high ability to insert and extract the electrode reactant, and thus a high energy density is able to be thereby obtained compared to a material containing a carbon material. Such an anode material may be a simple substance, an alloy, or a compound of silicon, or may have one or more phases thereof at least in part. In the invention, "alloys" include an alloy containing one or more metal elements and one or more metalloid elements, in addition to an alloy composed of two or more metal elements. It is needless to say that "alloy" in the invention may contain a nonmetallic element. The texture thereof includes a solid solution, a eutectic crystal (eutectic mixture), an intermetallic compound, and a texture in which two or more thereof coexist.

Examples of alloys of silicon include an alloy containing at least one selected from the group consisting of tin, nickel, copper, iron, cobalt, manganese, zinc, indium, silver, titanium, germanium, bismuth, antimony (Sb), and chromium as the second element other than silicon. Further, examples of compounds of silicon include a compound having oxygen or carbon (C). The compound of silicon may have the foregoing second element in addition to silicon. Examples of alloys or compounds of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), $LiSiO$ and the like.

The anode active material particles 3 are formed by, for example, vapor-phase deposition method, liquid-phase deposition method, spraying method, coating method, firing method, or two or more of these methods. Examples of vapor-phase deposition methods include physical deposition method and chemical deposition method, and specifically, vacuum evaporation method, sputtering method, ion plating method, laser ablation method, thermal Chemical Vapor Deposition (CVD) method, plasma CVD method and the like. Examples of liquid-phase deposition methods include a known technique such as electrolytic plating, electroless plating, and dipping method. Coating method is a method in which, for example, after a particulate anode active material is mixed with a binder and the like, the resultant mixture is dispersed in a solvent and then coating is provided. Firing method is, for example, a method in which after coating is provided by using coating method, heat treatment is provided at a temperature higher than the melting point of the binder or the like. For firing method, a known technique is available. Examples of firing methods include atmosphere firing method, reactive firing method, and hot press firing method.

Specially, the anode active material particles 3 are preferably formed by liquid phase deposition method, spraying method, or coating method. The anode active material particles 3 are thereby easily entered in the three-dimensional network structure formed from the plurality of metal fibers 2 compared to vapor-phase deposition method or the like.

The anode active material particles 3 may contain, as an anode material, other material not having silicon together with the material having silicon. Examples of other materials not having silicon include a carbon material such as graphitizable carbon, non-graphitizable carbon in which the spacing of (002) plane is 0.37 nm or more, and graphite in which the spacing of (002) plane is 0.34 nm or less; a metal oxide such as iron oxide, ruthenium oxide, and molybdenum oxide; and a polymer compound such as polyacetylene, polyaniline, and polypyrrole.

The median size of the anode active material particles 3 is not particularly limited, but is preferably from 0.1 µm to 30 µm both inclusive, and more preferably from 1 µm to 20 µm both inclusive. Thereby, the surface area of the anode active material particles 3 becomes appropriate, which contributes to improve the performance of an electrochemical device. More specifically, in the case where the median size is smaller than 0.1 µm, the surface area of the anode active material particles 3 is excessively increased, and thus the anode active material particles 3 are reacted with other material (for example, an electrolytic solution in a secondary battery or the like) in electrode reaction, and such other material becomes easily decomposed. Meanwhile, in the case where the median size is larger than 30 µm, the anode active material particles 3 are increased in size too much to be held by the metal fibers 2, and thus the anode active material particles 3 may be dropped in electrode reaction.

The anode may contain other material such as an anode binder and an anode electrical conductor together with the foregoing metal fibers 2 and the foregoing anode active material particles 3. If the anode binder is contained, the binding characteristics between the respective metal fibers 2, between the respective anode active material particles 3, or between the metal fibers 2 and the anode active material particles 3 are improved, and thus the current collectivity is further improved and the anode active material particles 3 are less likely to be dropped. Further, if the anode electrical conductor is contained, a conductive path is thereby obtained, and thus the current collectivity is further improved.

Examples of anode binders include a synthetic rubber such as styrene-butadiene rubber, fluorinated rubber, and ethylene propylene diene; a polymer material such as polyvinylidene fluoride; and a resin such as polyimide, polyamide, and polyamideimide. One thereof may be used singly, or a plurality thereof may be used by mixture.

Specially, as the anode binder, at least one resin among polyimide, polyamide, and polyamideimide is preferable for the following reasons: 1. since such a resin has high heat resistance, superior safety is obtained in an electrochemical device; 2. such a resin has higher solvent resistance (lower reactivity to the solvent) than that of a general binder material such as polyvinylidene fluoride, superior chemical stability is obtained; and 3. since a void (space margin) is generated when the resin is generated (in dehydration and condensation) and a stress associated with expansion and shrinkage of the anode active material particles 3 is relaxed in electrode reaction, breaking and separation of the anode active material particles 3 are thereby prevented.

In particular, at least part of the foregoing resin is preferably carbonized for the following reasons: 1. since a void is generated as well in carbonization, as described above, breaking and separation of the anode active material particles 3 are thereby prevented; and 2. since a carbide plays a role as an electrical conductor, the internal resistance of the anode is lowered. "Carbonization" means a state that the foregoing resin is heated (fired) at the decomposition temperature or more to be decomposed, and at least part of the resin is changed into a product of carbonization.

Examples of anode electrical conductors include a carbon material such as graphite, carbon black, acetylene black, and Ketjen black. Such a carbon material may be used singly, or a plurality thereof may be used by mixture. The anode electrical conductor may be a metal material, a conductive polymer molecule or the like as long as the material has the electric conductivity.

Figure 4:
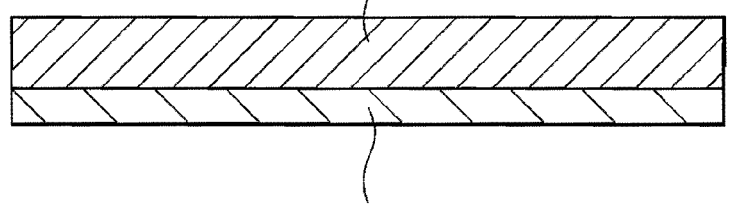
FIG. 4 is a cross sectional view illustrating another aspect of the anode according to the embodiment of the invention.

FIG. 4 is a view for explaining another aspect of the anode, and illustrates a cross section corresponding to FIG. 1. The anode may include an anode current collector 4 supporting the anode structure 1, since thereby the current collectivity is further improved. In this case, the anode structure 1 may be provided on only a single face of the anode current collector 4 or may be provided on both faces thereof.

The anode current collector 4 is preferably made of one or more metal materials having favorable electrochemical stability, a favorable electric conductivity, and a favorable mechanical strength. Examples of metal materials include copper, nickel, stainless and the like. Specially, copper is preferable, since thereby a high electric conductivity is obtainable.

In particular, the foregoing metal material is preferably a metal material not forming an intermetallic compound with the electrode reactant. If the intermetallic compound is formed with the electrode reactant, in operating an electrochemical device (for example, in charging and discharging a secondary battery), being easily affected by a stress due to expansion and shrinkage of the anode active material particles 3, the current collectivity may be lowered, and the anode active material particles 3 may be dropped. Examples of metal materials include copper, nickel, titanium, iron, chromium and the like.

Further, the foregoing metal material preferably a metal material being alloyed with the anode active material particles 3. Thereby, adhesion between the anode current collector 4 and the anode active material particles 3 are improved, and thus the anode active material particles 3 are less likely to be dropped. Examples of metal materials that do not form an intermetallic compound with the electrode reactant and that are alloyed with the anode active material particles 3 include copper, nickel, iron and the like. These metal materials are preferable in terms of strength and electric conductivity as well.

The anode current collector 4 may have a single layer structure or a multilayer structure. In the case where the anode current collector 4 has the multilayer structure, it is preferable that the layer adjacent to the anode active material particles 3 is made of a metal material being alloyed with the anode active material particles 3, and layers not adjacent to the anode active material particles 3 are made of other metal material.

The surface of the anode current collector 4 is preferably roughened. Thereby, due to the so-called anchor effect, the adhesion between the anode current collector 4 and the anode active material particles 3 are improved. In this case, it is enough that at least in the surface region of the anode current collector 4 opposed to the anode active material particles 3 is roughened. Examples of roughening methods include a method of forming fine particles by electrolytic treatment and the like. The electrolytic treatment is a method of providing concavity and convexity by forming the fine particles on the surface of the anode current collector 4 by electrolytic method in an electrolytic bath. A copper foil formed by using the electrolytic method is generally called "electrolytic copper foil."

Arithmetic average roughness Ra of the surface of the anode current collector 4 is not particularly limited, but is preferably 0.2 µm or more, since thereby the adhesion between the anode current collector 4 and the anode active material particles 3 are further improved. However, in the case where the arithmetic average roughness Ra is excessively large, the adhesion may be decreased. Thus, the arithmetic average roughness Ra is preferably 0.4 µm or less.

The anode is manufactured, for example, by the following procedure.

First, the plurality of metal fibers 2 are prepared. As the metal fibers 2, while a commercialized product that has been already used for industrial usage is able to be used, but it is preferable to use metal fibers that have been previously formed into a sheet in which the three-dimensional network structure is formed. Subsequently, an anode material having silicon, an anode binder, and an anode electrical conductor if necessary are mixed to obtain an anode mixture, which is dispersed in a dispersion medium such as an organic solvent, and thereby anode mixture slurry is obtained. Finally, after the plurality of metal fibers 2 are dipped into the anode mixture slurry, taken out and dried, and thereby the plurality of anode active material particles 3 are formed. At this time, the number of dipping is able to be arbitrarily set according to conditions such as the amount of the anode active material particles 3 held by the metal fibers 2. Thereby, the plurality of anode active material particles 3 are held by the three-dimensional network structure formed from the plurality of metal fibers 2. Accordingly, the anode is completed.

The anode includes the plurality of metal fibers 2 forming the three-dimensional network structure and the plurality of anode active material particles 3 having silicon. Thus, compared to a general anode in which an active material layer is provided on a current collector, the current collectivity is improved. Therefore, the anode is able to contribute to improve the cycle characteristics for an electrochemical device using the anode.

The current collector may exist, but is not indispensable. In the case where the current collector is not necessitated, the thickness of the anode is able to be reduced by a portion obtained by omitting the current collector.

In particular, in the case where the metal fibers 2 are at least one selected from the group consisting of titanium, iron, stainless, copper, aluminum, zinc, silver, cobalt, nickel, and chromium, a high electric conductivity and a high strength are obtained, and thus higher effect is obtainable. Further, as a structural parameter of the metal fibers 2, in the case where the diameter D is from 0.5 µm to 50 µm both inclusive, the ratio B/A is 2 or more, or the ratio Y/X is 1 or less, the strength and the conductive path of the metal fibers 2 are stably secured, and thus higher effect is obtainable.

Further, if the plurality of metal fibers 2 form a sheet, in the case where the thickness of the sheet is from 10 µm to 200 µm both inclusive, the porosity is 20% to 95% both inclusive, or the tensile strength is 0.1 N/mm or more, higher effect is obtainable.

Further, if the median particle size of the anode active material particles 3 is from 0.1 µm to 30 µm both inclusive, or from 1 µm to 20 µm both inclusive, the surface area becomes appropriate, and thus higher effect is obtainable.

Further, if the anode contains the anode binder containing at least one resin selected from the group consisting of polyimide, polyamide, and polyamideimide, higher heat resistance and the like are obtainable. Thus, in this case, higher effect is obtainable compared to a case that other material such as polyvinylidene fluoride is used as a binder. In this case, if at least part of the resin is carbonized, the electric conductivity and the like are improved and thus higher effect is obtainable.

Further, in the case where the anode contains the anode electrical conductor containing the carbon material, the electric conductivity is improved and thus higher effect is obtainable.

Further, in the case where the anode includes the anode current collector 4 supporting the plurality of metal fibers 2 and the plurality of anode active material particles 3, the current collectivity is further improved, and thus higher effect is obtainable. In this case, in the case where the arithmetic average roughness Ra of the surface of the anode current collector 4 is 0.2 µm or more, the adhesion between the anode current collector 4 and the anode active material particles 3 are improved and thus higher effect is obtainable.

A description will be hereinafter given of the technical significance of the invention. The characteristic of the anode of the embodiment of the invention is the structure in which the plurality of metal fibers 2 forming the three-dimensional network structure is the framework (base), and holds the plurality of anode active material particles 3. In other words, the three-dimensional network structure in the embodiment of the invention is different from the three-dimensional network structure (three-dimensional network structure formed by using a porous resin) described as a related art in terms of the characteristics that the three-dimensional network structure in the embodiment of the invention is formed from the plurality of metal fibers 2 originally having a sufficient strength. Thereby, though a separately provided current collector is not necessitated, the conductive path is able to be improved to the degree not obtained with the use of the general anode. In the anode of the embodiment of the invention, the plurality of metal fibers 2 form the outer shape of the anode, for which the plurality of anode active material particles 3 are provided. Therefore, if the current collector is not used, regarding the volume ratio in the anode, it is preferable that the volume ratio of the plurality of metal fibers 2 is larger than the volume ratio of the plurality of anode active material particles 3 in order to obtain high current collectivity. Accordingly, the structure of the anode of the embodiment of the invention is apparently different from the structure of the general anode in which metal fibers are simply added as an electrical conductor to the active material layer. In the general anode, regarding the volume ratio in the anode, the volume ratio of the plurality of metal fibers (electrical conductor) should be overwhelmingly smaller than the volume ratio of the plurality of anode active material particles. Thus, in the general anode, the plurality of metal fibers are not able to form the three-dimensional network structure and the plurality of metal fibers are not able to hold the plurality of anode active material particles. For reference, a description will be hereinafter given of the reason thereof. The length of the metal fibers used in the embodiment of the invention should be long to some extent to the fiber diameter in order to form the three-dimensional network structure, and is about several μm to several cm. Meanwhile, the length of the metal fibers used as an electrical conductor in the general anode is about several μm at most. That is, the length of the metal fibers of the anode in the embodiment of the invention is largely different from the length of the metal fibers of the general anode.

Next, a description will be hereinafter given of a usage example of the foregoing anode. As an example of the electrochemical devices, secondary batteries are herein taken. The anode is used for the secondary batteries as follows.

First Secondary Battery

Figure 5:
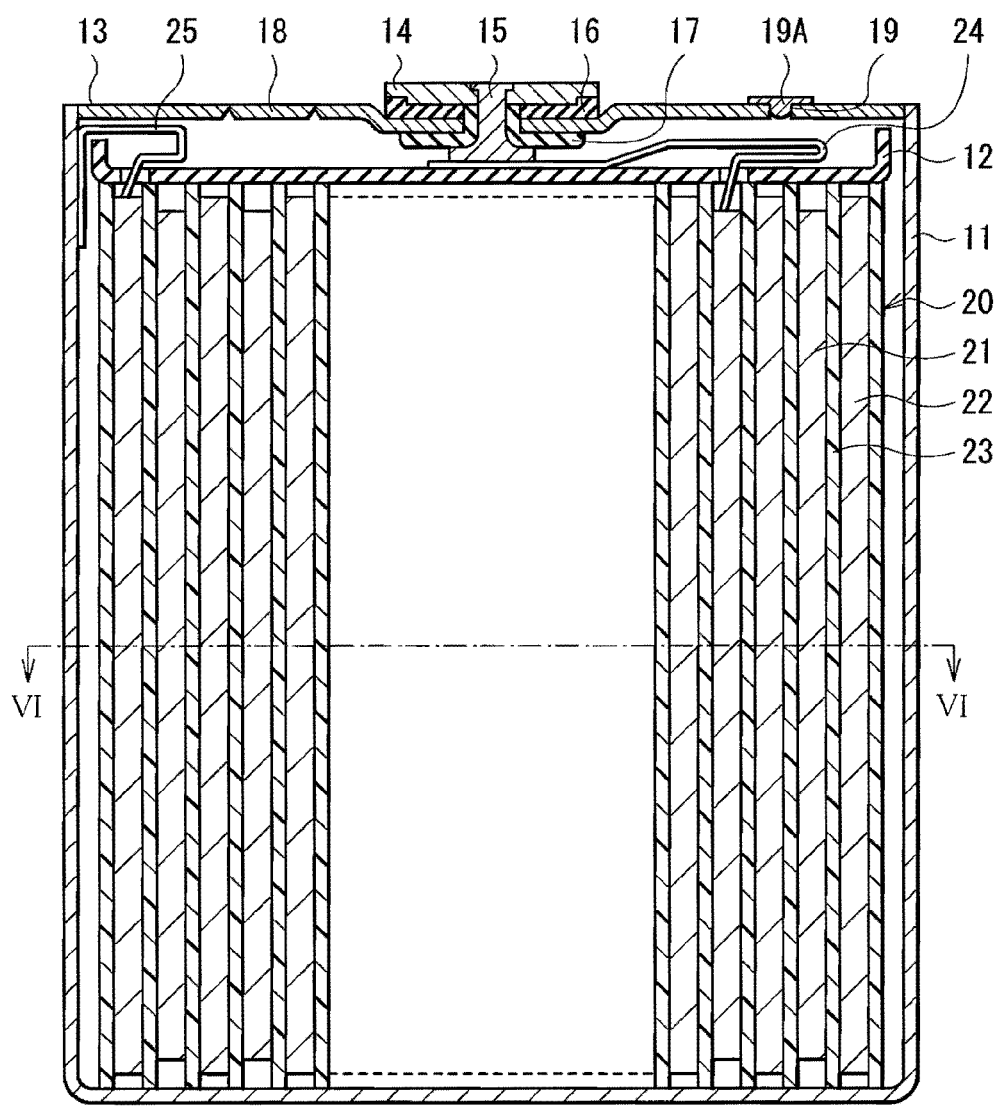
FIG. 5 is a cross sectional view illustrating a structure of a first secondary battery including the anode according to the embodiment of the invention.
Figure 6:
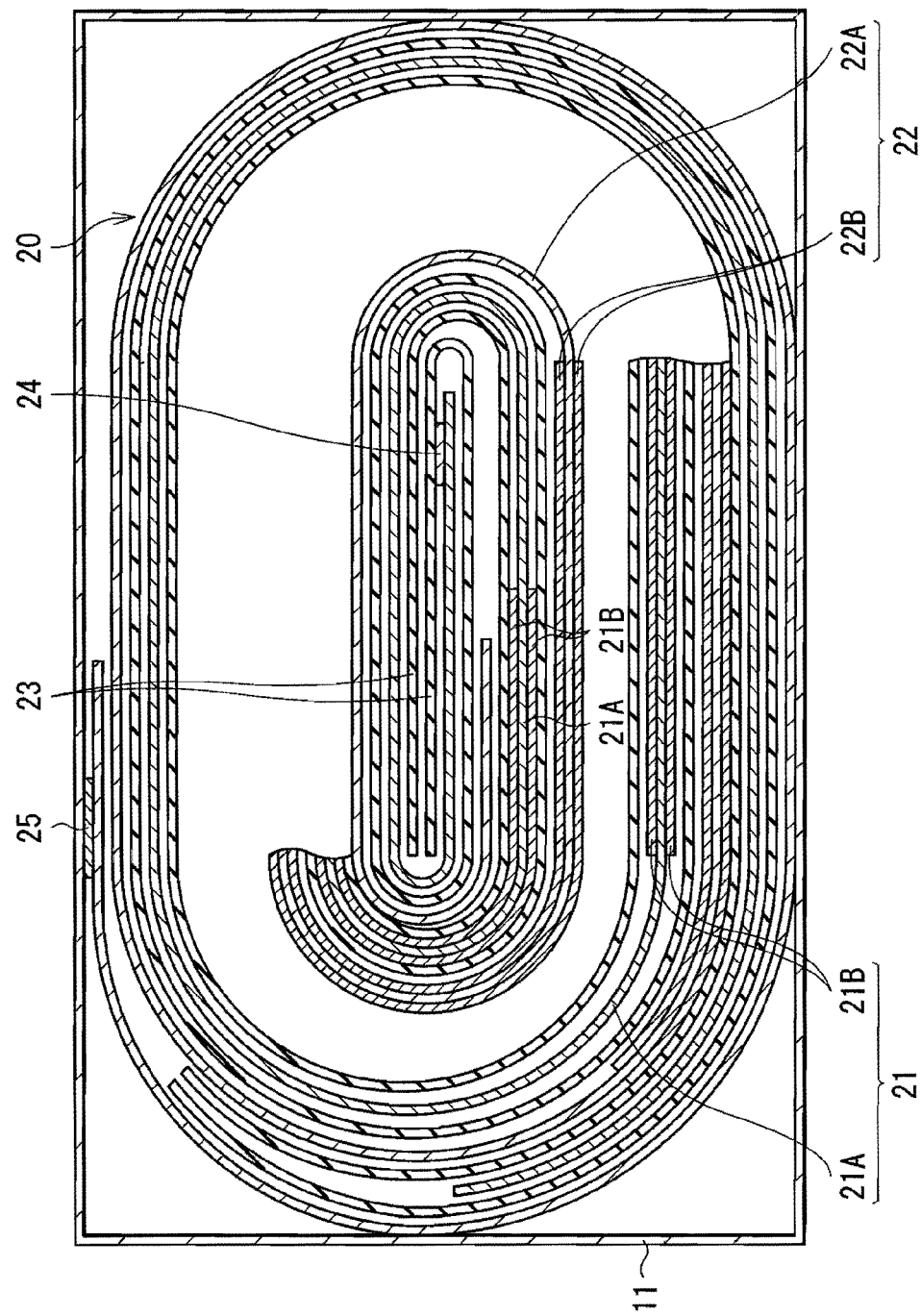
FIG. 6 is a cross sectional view taken along line VI-VI of the first secondary battery illustrated in FIG. 5.

FIG. 5 and FIG. 6 illustrate a cross sectional structure of a first secondary battery. FIG. 6 illustrates a cross section taken along line VI-VI illustrated in FIG. 5. The secondary battery herein described is, for example, a lithium ion secondary battery in which the capacity of an anode 22 is expressed based on insertion and extraction of lithium as an electrode reactant.

The secondary battery mainly contains a battery element 20 having a flat spirally wound structure in a battery can 11.

The battery can 11 is, for example, a square package member. As illustrated in FIG. 6, the square package member has a shape with the cross section in the longitudinal direction of a rectangle or an approximate rectangle (including curved lines in part). The battery can 11 forms not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 6 illustrates a case that the battery can 11 has a rectangular cross sectional shape. The battery structure including the battery can 11 is a so-called square type.

The battery can 11 is made of, for example, a metal material containing iron, aluminum, or an alloy thereof. The battery can 11 may have a function as an electrode terminal as well. In this case, to prevent the secondary battery from being swollen by using the rigidity (hardly deformable characteristics) of the battery can 11 in charge and discharge, the battery can 11 is preferably made of rigid iron than aluminum. In the case where the battery can 11 is made of iron, for example, the iron may be plated by nickel (Ni) or the like.

The battery can 11 also has a hollow structure in which one end of the battery can 11 is closed and the other end of the battery can 11 is opened. At the open end of the battery can 11, an insulating plate 12 and a battery cover 13 are attached, and thereby inside of the battery can 11 is hermetically closed. The insulating plate 12 is arranged perpendicularly to the spirally wound circumferential face of the battery element 20 between the battery element 20 and the battery cover 13, and is made of, for example, polypropylene or the like. The battery cover 13 is, for example, made of a material similar to that of the battery can 11, and may also have a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless steel ball.

The battery element 20 is formed by layering a cathode 21 and the anode 22 with a separator 23 in between and then spirally winding the resultant laminated body. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on both faces of a cathode current collector 21A. However, for example, the cathode active material layer 21B may be provided only on a single face of the cathode current collector 21A.

The cathode current collector 21A is made of, for example, a metal material such as aluminum, nickel, and stainless. The cathode active material layer 21B contains, as a cathode active material, one or more cathode materials capable of inserting and extracting lithium. According to needs, the cathode active material layer 21B may contain a cathode binder, a cathode electrical conductor or the like.

As the cathode material capable of inserting and extracting lithium, for example, a lithium-containing compound is preferable, since thereby a high energy density is obtainable. Examples of lithium-containing compounds include a complex oxide containing lithium and a transition metal element, a phosphate compound containing lithium and a transition metal element and the like. Specially, a compound containing at least one selected from the group consisting of cobalt, nickel, manganese, and iron as a transition metal element is preferable, since thereby a higher voltage is obtainable. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

Examples of complex oxides containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) and the like. Specially, a complex oxide containing cobalt is preferable, since thereby a high capacity is obtained and superior cycle characteristics are obtained. Further, examples of phosphate compounds containing lithium and a transition metal element include lithium iron phosphate compound ($LiFePO_4$), a lithium iron manganese phosphate compound ($LiFe_{1-u}Mn_uPO_4$ (u<1)) and the like.

In addition, examples of cathode materials capable of inserting and extracting lithium include an oxide such as titanium oxide, vanadium oxide, and manganese dioxide; a disulfide such as titanium disulfide and molybdenum sulfide; a chalcogenide such as niobium selenide; sulfur; and a conductive polymer such as polyaniline and polythiophene.

Examples of cathode binders include a synthetic rubber such as styrene-butadiene rubber, fluorinated rubber, and ethylene propylene diene; a polymer material such as polyvinylidene fluoride and the like. One thereof may be used singly, or a plurality thereof may be used by mixture. Further, examples of cathode electrical conductors include a carbon material similar to the anode electrical conductor.

The anode 22 has a structure similar to that of the anode described above. For example, in the anode 22, an anode structure 22B is provided on both faces of an anode current collector 22A. However, for example, the anode structure 22B may be provided only on a single face of the anode current collector 22A. The structures of the anode current collector 22A and the anode structure 22B are respectively similar to the structures of the anode current collector 4 and the anode structure 1 in the foregoing anode. The chargeable capacity in the anode material capable of inserting and extracting lithium is preferably larger than the discharge capacity of the cathode 21.

As described for the foregoing anode, it is possible that the anode 22 is composed of only the anode structure 22B and does not have the anode current collector 22A.

The maximum usage ratio in the full charge state of the anode 22 (anode utilization) is not particularly limited. Specially, by adjusting the ratio between the capacity of the cathode 21 and the capacity of the anode 22, the maximum usage ratio is preferably from 20% to 80% both inclusive, since thereby the cycle characteristics and the initial charge and discharge characteristics are improved. More specifically, in the case where the anode utilization is smaller than 20%, the initial charge and discharge efficiency may be lowered since side reaction by the anode active material particles (for example, silicon simple substance) not distributing to charge and discharge is increased. Further, since the electric potential of the anode 22 in a charged state becomes high, a favorable coat due to decomposition of the electrolytic solution is less likely to be formed on the surface of the anode 22, and there is a possibility that side reaction is not able to be sufficiently prevented. Meanwhile, in the case where the anode utilization is larger than 80%, expansion and shrinkage of the anode structure 22B are difficult to be prevented in charge and discharge, and thus the anode structure 22B may be dropped. The maximum usage ratio of the anode 22 is more preferably from 30% to 70% both inclusive, since thereby higher effect is obtained.

The foregoing "anode utilization" is expressed by anode utilization C (%)=(V1/V2)×100 where the lithium insertion amount per unit area in the full charge state of the anode 22 is V1 and the lithium amount capable of being electrochemically inserted into the anode 22 per unit area is V2. In the case where the anode material is a material having a metal element or a metalloid element capable of forming an alloy with lithium, the foregoing "insertion" means that lithium is alloyed with the anode material.

The insertion amount V1 is obtainable by, for example, the following procedure. First, after the secondary battery is charged to become in the full charge state, the secondary battery is disassembled, and the portion in the anode 22 that is opposed to the cathode 21 with the separator 23 in between is cut out as an inspection anode. Subsequently, by using the inspection anode, an evaluation battery in which a metal lithium is a counter electrode is assembled. Finally, the evaluation battery is discharged and the discharge capacity is examined. After that, the discharge capacity is divided by the area of the inspection anode to calculate insertion amount V1. "Discharge" in this case means applying a current in the direction in which lithium ions are extracted from the inspection anode. That is, the insertion amount V1 is a value determined by a lithium extraction amount from the cathode 21 opposed to the anode 22.

Meanwhile, the insertion amount V2 is obtained by, for example, as follows. The foregoing evaluation battery that has been already discharged is charged under a constant current and a constant voltage until the battery voltage reaches 0V to examine the charge capacity. After that, the charge capacity is divided by the area of the inspection anode. "Charge" in this case means applying a current in the direction in which lithium ions are inserted into the inspection anode. That is, the insertion amount V2 is a value determined by the maximum amount of lithium capable of being inserted into the anode 22.

Charge and discharge conditions in obtaining the foregoing insertion amounts V1 and V2 are, for example, as follows. In discharge, for example, constant current discharge is performed until the battery voltage of the evaluation battery reaches 1.5 V while the current density is set to 1 $mA/cm^2$. In charge, for example, constant current charge is performed until the battery voltage reaches 0 V while the current density is set to 1 $mA/cm^2$, and subsequently constant voltage charge is performed until the current value becomes 0.05 mA while the battery voltage is set to 0 V.

The separator 23 separates the cathode 21 from the anode 22, and passes lithium ions while preventing current short circuit due to contact of both electrodes. The separator 23 may be made of, for example, a porous film composed of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains a solvent and an electrolyte salt dissolved therein.

The solvent contains, for example, one or more nonaqueous solvents such as an organic solvent. Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like. Specially, at least one selected from the group consisting of ethylene carbonate, propylene carbonate, dimethyl carbonate, diethyl carbonate, and ethyl methyl carbonate is preferable. In particular, a mixture of a high viscosity (high dielectric constant) solvent (for example, specific inductive $\in \geq 30$) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation property of the electrolyte salt and ion mobility are improved.

The solvent preferably contains at least one of a chain ester carbonate having halogen as an element represented by Chemical formula 1 and a cyclic ester carbonate having halogen as an element represented by Chemical formula 2. Thereby, a stable protective film is formed on the surface of the anode 22 and decomposition reaction of the electrolytic solution is prevented, and thus the cycle characteristics are improved.

Chemical formula 1

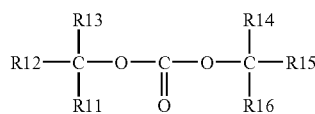

In the formula, R11 to R16 are a hydrogen group, a halogen group, an alkyl group, or an alkyl halide group. At least one of R11 to R16 is the halogen group or the alkyl halide group.

Chemical formula 2

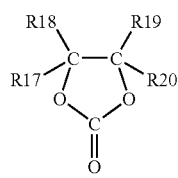

In the formula, R17 to R20 are a hydrogen group, a halogen group, an alkyl group, or an alkyl halide group. At least one of R17 to R20 is the halogen group or the alkyl halide group.

R11 to R16 in Chemical formula 1 may be identical or different. The same is applied to R17 to R20 in Chemical formula 2. Though the halogen type is not particularly limited, examples thereof include at least one selected from the group consisting of fluorine, chlorine, and bromine, and fluorine is specially preferable since thereby higher effect is obtained. It is needless to say that other halogen may be applicable.

The number of halogen is more preferably two than one, and further may be three or more, since thereby an ability to form a protective film is improved, and a more rigid and more stable protective film is formed. Accordingly, decomposition reaction of the electrolytic solution is further prevented.

Examples of chain ester carbonates having halogen represented by Chemical formula 1 include fluoromethyl methyl carbonate, bis(fluoromethyl)carbonate, difluoromethyl methyl carbonate and the like. One thereof may be used singly, or a plurality thereof may be used by mixture.

Examples of cyclic ester carbonates having halogen represented by Chemical formula 2 include compounds represented by Chemical formulas 3(1) to 4(9). That is, examples thereof include 4-fluoro-1,3-dioxolane-2-one of Chemical formula 3(1), 4-chloro-1,3-dioxolane-2-one of Chemical formula 3(2), 4,5-difluoro-1,3-dioxolane-2-one of Chemical formula 3(3), tetrafluoro-1,3-dioxolane-2-one of Chemical formula 3(4), 4-chloro-5-fluoro-1,3-dioxolane-2-one of Chemical formula 3(5), 4,5-dichloro-1,3-dioxolane-2-one of Chemical formula 3(6), tetrachloro-1,3-dioxolane-2-one of Chemical formula 3(7), 4,5-bistrifluoromethyl-1,3-dioxolane 2-one of Chemical formula 3(8), 4-trifuloromethyl-1,3-dioxolane-2-one of Chemical formula 3(9), 4,5-difluoro-4,5-dimethyl-1,3-dioxolane-2-one of Chemical formula 3(10), 4,4-difluoro-5-methyl-1,3-dioxolane-2-one of Chemical formula 3(11), 4-ethyl-5,5-difluoro-1,3-dioxolane-2-one of Chemical formula 3(12) and the like. Further, 4-fluoro-5-trifluoromethyl-1,3-dioxolane-2-one of Chemical formula 4(1), 4-methyl-5-trifluoromethyl-1,3-dioxolane-2-one of Chemical formula 4(2), 4-fluoro-4,5-dimethyl-1,3-dioxolane-2-one of Chemical formula 4(3), 5-(1,1-difluoroethyl)-4,4-difluoro-1,3-dioxolane-2-one of Chemical formula 4(4), 4,5-dichloro-4,5-dimethyl-1,3-dioxolane-2-one of Chemical formula 4(5), 4-ethyl-5-fluoro-1,3-dioxolane-2-one of Chemical formula 4(6), 4-ethyl-4,5-difluoro-1,3-dioxolane-2-one of Chemical formula 4(7), 4-ethyl-4,5,5-trifluoro-1,3-dioxolane-2-one of Chemical formula 4(8), 4-fluoro-4-methyl-1,3-dioxolane-2-one of Chemical formula 4(9) and the like. One thereof may be used singly, or a plurality thereof may be used by mixture.

Chemical formula 3

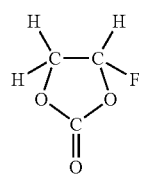
(1)

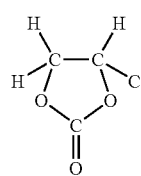
(2)

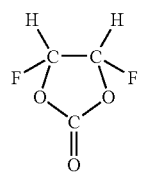
(3)

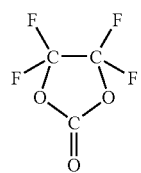
(4)

-continued
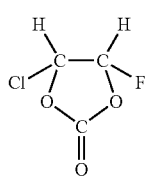 (5)
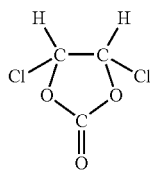 (6)
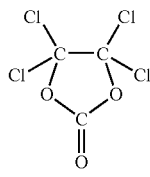 (7)
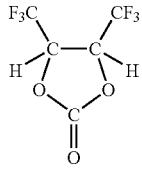 (8)
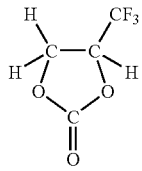 (9)
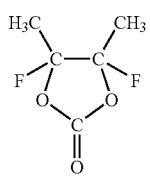 (10)
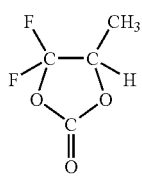 (11)
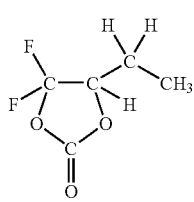 (12)
Chemical formula 4
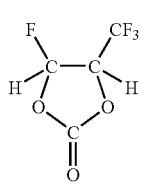 (1)
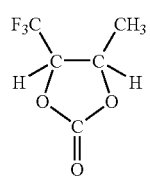 (2)
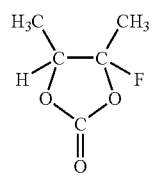 (3)
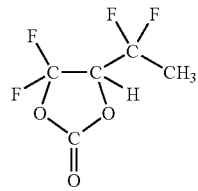 (4)
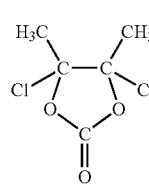 (5)
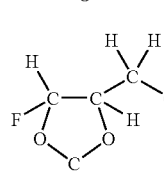 (6)
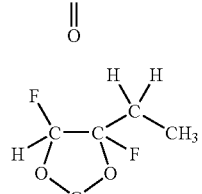 (7)
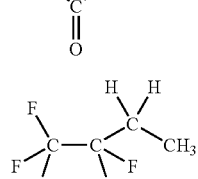 (8)
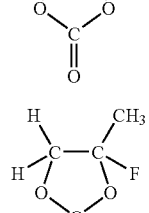 (9)
Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

The solvent preferably contains a cyclic ester carbonate having an unsaturated bond represented by Chemical formula 5 to Chemical formula 7. Thereby, the cycle characteristics are further improved. One thereof may be used singly, or a plurality thereof may be used by mixture.

Chemical formula 5

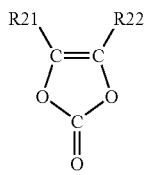

In the formula, R21 and R22 are a hydrogen group or an alkyl group.

Chemical formula 6

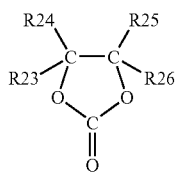

In the formula, R23 to R26 are a hydrogen group, an alkyl group, a vinyl group, or an aryl group. At least one of R23 to R26 is the vinyl group or the aryl group.

Chemical formula 7

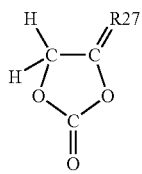

In the formula, R27 is an alkylene group.

The cyclic ester carbonate having an unsaturated bond represented by Chemical formula 5 is a vinylene carbonate compound. Examples of vinylene carbonate compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like. Specially, vinylene carbonate is preferable, since vinylene carbonate is easily available and provides high effect.

The cyclic ester carbonate having an unsaturated bond represented by Chemical formula 6 is a vinylethylene carbonate compound. Examples of vinylethylene carbonate compounds include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated bond represented by Chemical formula 7 is a methylene ethylene carbonate compound. Examples of methylene ethylene carbonate compounds include 4-methylene-1,3-dioxolane-2-one, 4,4-dimethyl-5-methylene-1,3-dioxolane-2-one, 4,4-diethyl-5-methylene-1,3-dioxolane-2-one and the like. The methylene ethylene carbonate compound may have one methylene group (compound represented by Chemical formula 7), or have two methylene groups.

The cyclic ester carbonate having an unsaturated bond may be catechol carbonate having a benzene ring or the like, in addition to the compounds represented by Chemical formula 5 to Chemical formula 7.

The electrolyte salt contains, for example, one or more light metal salts such as a lithium salt. Examples of lithium salts include lithium hexafluorophosphate, lithium tetrafluoroborate, lithium perchlorate, lithium hexafluoroarsenate and the like, since thereby a superior battery capacity, superior cycle characteristics, and superior storage characteristics are obtained. Specially, lithium hexafluorophosphate is preferable, since the internal resistance is lowered, and thus higher effect is obtained.

The electrolyte salt preferably contains at least one selected from the group consisting of the compounds represented by Chemical formula 8 to Chemical formula 10. Thereby, in the case where such a compound is used together with the foregoing lithium hexafluorophosphate or the like, higher effect is obtained. R31 and R33 in Chemical formula 8 may be identical or different. The same is applied to R41 to R43 in Chemical formula 9 and R51 and R52 in Chemical formula 10.

Chemical formula 8

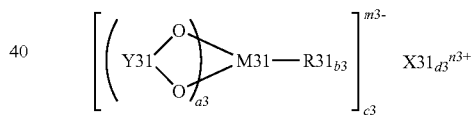

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O=)C—R32-C(=O)—, —(O=)C—C(R33)$_2$-, or —(O=)C—C(=O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 9

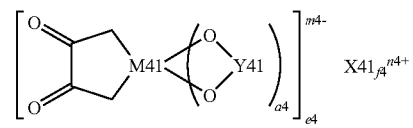

In the formula, X41 is a Group 1 element or a Group 2 element in the long period periodic table. M41 is a transition metal element, a Group 13 element, a Group 14 element, or a Group 15 element in the long period periodic table. Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—. R41 and R43 are a hydrogen group, an alkyl group, a halogen group, or an alkyl halide group. At least one of R41 and R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 10

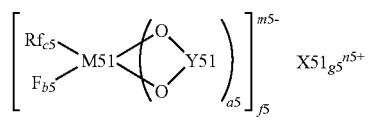

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$-, —(R52)$_2$C—(C(R51)$_2$)$_{d5}$-S(=O)$_2$—, —(O=)$_2$S—(C(R51)$_2$)$_{e5}$-S(=O)$_2$—, or —(O=)C—(C(R51)$_2$)$_{e5}$-S(=O)$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

The long period periodic table is shown in "Inorganic chemistry nomenclature (revised edition)" proposed by IUPAC (International Union of Pure and Applied Chemistry). Specifically, Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of compounds represented by Chemical formula 8 include the compounds represented by Chemical formulas 11(1) to 11(6) and the like. Examples of compounds represented by Chemical formula 9 include the compounds represented by Chemical formulas 12(1) to 12(8) and the like. Examples of compounds represented by Chemical formula 10 include the compound represented by Chemical formula 13 and the like. It is needless to say that the compound is not limited to the compounds represented by Chemical formula 11(1) to Chemical formula 13 as long as the compound has a structure having the structure represented by Chemical formula 8 to Chemical formula 10.

Chemical formula 11

(1)

(2)

(3)

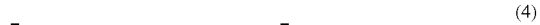

(4)

(5)

(6)

Chemical formula 12

(1)

(2)

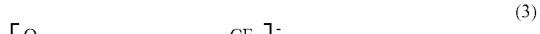

(3)

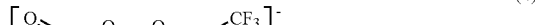

(4)

(5)

-continued

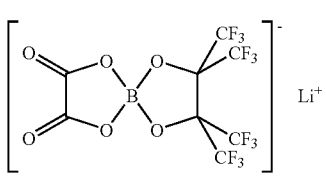
(6)

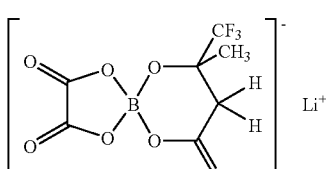
(7)

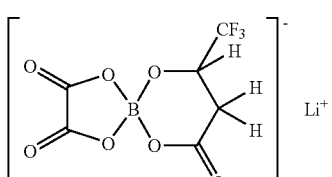
(8)

Chemical formula 13

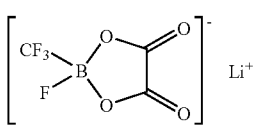

Further, the electrolyte salt may contain at least one selected from the group consisting of the compounds represented by Chemical formula 14 to Chemical formula 16. Thereby, in the case where such a compound is used together with the foregoing lithium hexafluorophosphate or the like, higher effect is obtained. m and n in Chemical formula 14 may be identical or different. The same is applied to p, q, and r in Chemical formula 16.

$$\text{LiN}(C_mF_{2m+1}SO_2)(C_nF_{2n+1}SO_2) \quad \text{Chemical formula 14}$$

In the formula, m and n are an integer number of 1 or more.

Chemical formula 15

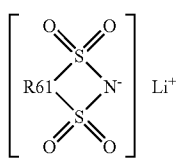

In the formula, R61 is a straight chain or branched perfluoro alkylene group with the carbon number from 2 to 4 both inclusive.

$$\text{LiC}(C_pF_{2p+1}SO_2)(C_qF_{2q+1}SO_2)(C_rF_{2r+1}SO_2) \quad \text{Chemical formula 16}$$

In the formula, p, q, and r are an integer number of 1 or more.

Examples of chain compounds represented by Chemical formula 14 include lithium bis(trifluoromethanesulfonyl)imide ($\text{LiN}(CF_3SO_2)_2$), lithium bis(pentafluoroethanesulfonyl)imide ($\text{LiN}(C_2F_5SO_2)_2$), lithium (trifluoromethanesulfonyl)(pentafluoroethanesulfonyl)imide ($\text{LiN}(CF_3SO_2)(C_2F_5SO_2)$), lithium (trifluoromethanesulfonyl)(heptafluoropropanesulfonyl)imide ($\text{LiN}(CF_3SO_2)$ ($C_3F_7SO_2$)), lithium (trifluoromethanesulfonyl)(nonafluorobutanesulfonyl)imide ($\text{LiN}(CF_3SO_2)(C_4F_9SO_2)$) and the like. One thereof may be used singly, or a plurality thereof may be used by mixture.

Examples of cyclic compounds represented by Chemical formula 15 include the compounds represented by Chemical formulas 17(1) to 17(4). That is, examples thereof include lithium 1,2-perfluoroethanedisulfonylimide represented by Chemical formula 17(1), lithium 1,3-perfluoropropanedisulfonylimide represented by Chemical formula 17(2), lithium 1,3-perfluorobutanedisulfonylimide represented by Chemical formula 17(3), lithium 1,4-perfluorobutanedisulfonylimide represented by Chemical formula 17(4) and the like. One thereof may be used singly, or a plurality thereof may be used by mixture. Specially, lithium 1,2-perfluoroethanedisulfonylimide is preferable, since thereby high effect is obtained.

Chemical formula 17

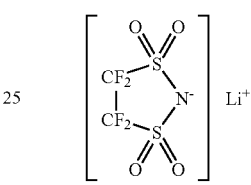
(1)

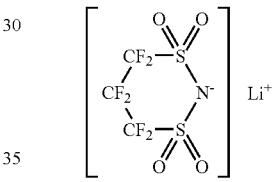
(2)

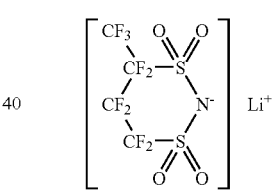
(3)

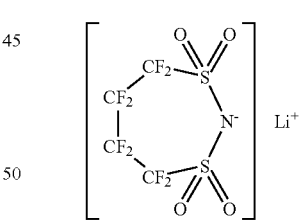
(4)

Examples of chain compounds represented by Chemical formula 16 include lithium tris(trifluoromethanesulfonyl)methyde ($\text{LiC}(CF_3SO_2)_3$) and the like.

The content of the electrolyte salt to the solvent is preferably from 0.3 mol/kg to 3.0 mol/kg both inclusive. If the content is out of the foregoing range, there is a possibility that the ion conductivity is significantly lowered.

The electrolytic solution may contain various additives together with the solvent and the electrolyte salt. Thereby, the chemical stability of the electrolytic solution is further improved.

Examples of additives include sultone (cyclic ester sulfonate). The sultone represents, for example, propane sultone, propene sultone or the like, and propane sultone is specially preferable. One thereof may be used singly, or a plurality thereof may be used by mixture. The sultone content in the electrolytic solution is, for example, 0.5 wt % to 5 wt % both inclusive.

Further, examples of additives include an acid anhydride. The acid anhydride represents, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like. Specially, succinic anhydride or sulfobenzoic anhydride represented by Chemical formula 18 is preferable. The anhydrides may be used singly, or a plurality thereof may be used by mixture. The content of the acid anhydride in the electrolytic solution is, for example, from 0.5 wt % to 5 wt % both inclusive.

Chemical formula 18

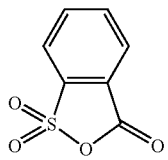

The secondary battery is manufactured, for example, by the following procedure.

First, the cathode 21 is formed. First, a cathode active material, a cathode binder, and a cathode electrical conductor are mixed to prepare a cathode mixture, which is dispersed in an dispersion medium such as an organic solvent to obtain paste cathode mixture slurry. Subsequently, both faces of the cathode current collector 21A are uniformly coated with the cathode mixture slurry by using a doctor blade, a bar coater or the like, which is dried. Finally, the coating is compression-molded by using a rolling press machine or the like while being heated if necessary to form the cathode active material layer 21B. In this case, the resultant may be compression-molded over several times.

Next, the anode 22 is formed by forming the anode structure 22B on both faces of the anode current collector 22A by the same procedure as that of forming the anode described above.

Next, the battery element 20 is formed by using the cathode 21 and the anode 22. First, the cathode lead 24 and the anode lead 25 are respectively attached to the cathode current collector 21A and the anode current collector 22A by welding or the like. Subsequently, the cathode 21 and the anode 22 are layered with the separator 23 in between, and then are spirally wound in the longitudinal direction. Finally, the spirally wound body is formed into a flat shape. Accordingly, the battery element 20 is formed.

The secondary battery is assembled as follows. First, after the battery element 20 is contained in the battery can 11, the insulating plate 12 is arranged on the battery element 20. Subsequently, the cathode lead 24 and the anode lead 25 are respectively connected to the cathode pin 15 and the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery illustrated in FIG. 5 and FIG. 6 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, the current collectivity of the anode 22 is improved. Accordingly, the cycle characteristics are able to be improved. In this case, the thickness of the anode 22 is decreased, and the number of spirally winding the battery element 20 is able to be increased. Accordingly, the battery capacity is able to be improved.

In particular, in the foregoing secondary battery, if the anode 22 contains silicon advantageous to realizing a high capacity of the anode 22, the cycle characteristics are improved. Thus, higher effect is obtainable than in a case that other anode material such as a carbon material is contained.

Further, in the case where the anode utilization is from 20% to 80% both inclusive, higher effect is obtainable.

Further, in the case where the battery can 11 is made of a rigid metal, compared to a case that the battery can 11 is made of a soft film, the anode 22 is less likely to break in the case where the anode active material layer 22B is swollen or shrunk. Accordingly, the cycle characteristics are able to be further improved. In this case, in the case where the battery can 11 is made of iron that is more rigid than aluminum, higher effect is obtainable.

Effects of the secondary battery other than the foregoing effects are similar to those of the foregoing anode.

Second Secondary Battery

Figure 7:
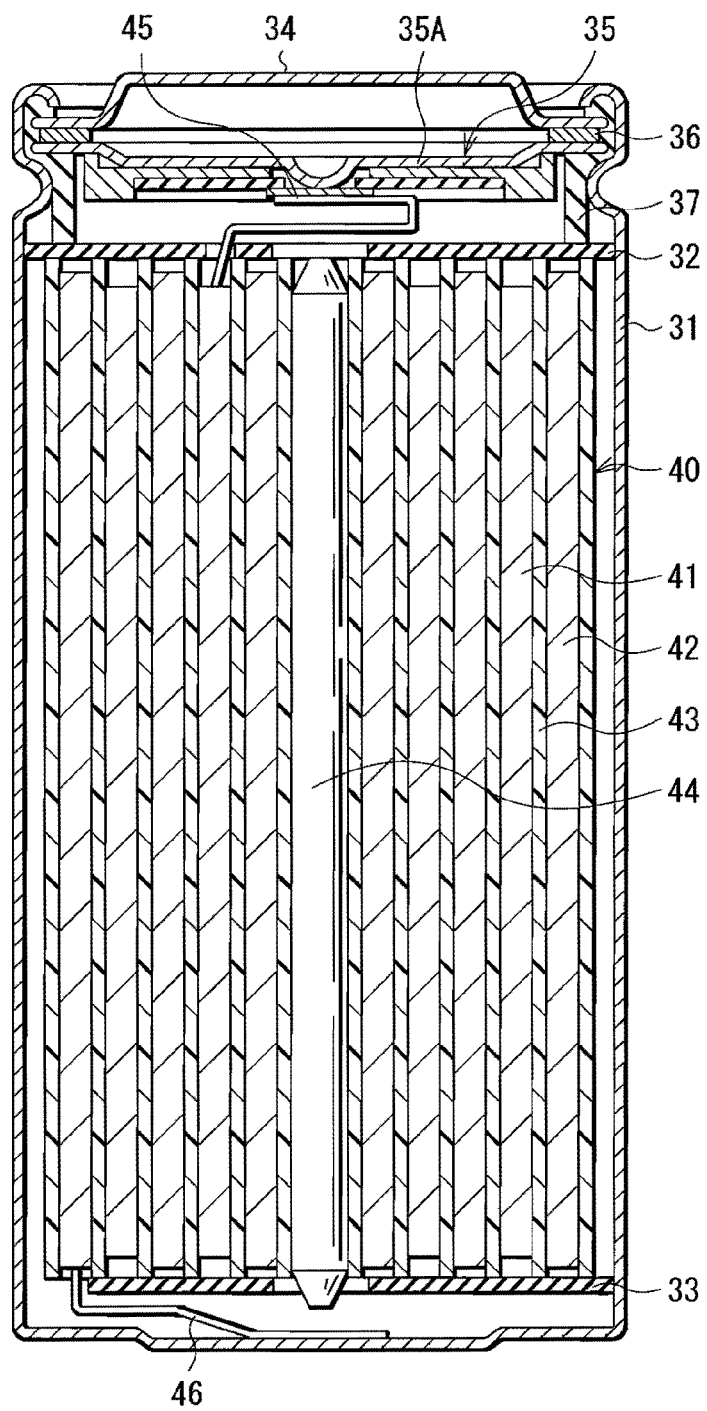
FIG. 7 is a cross sectional view illustrating a structure of a second secondary battery including the anode according to the embodiment of the invention.
Figure 8:
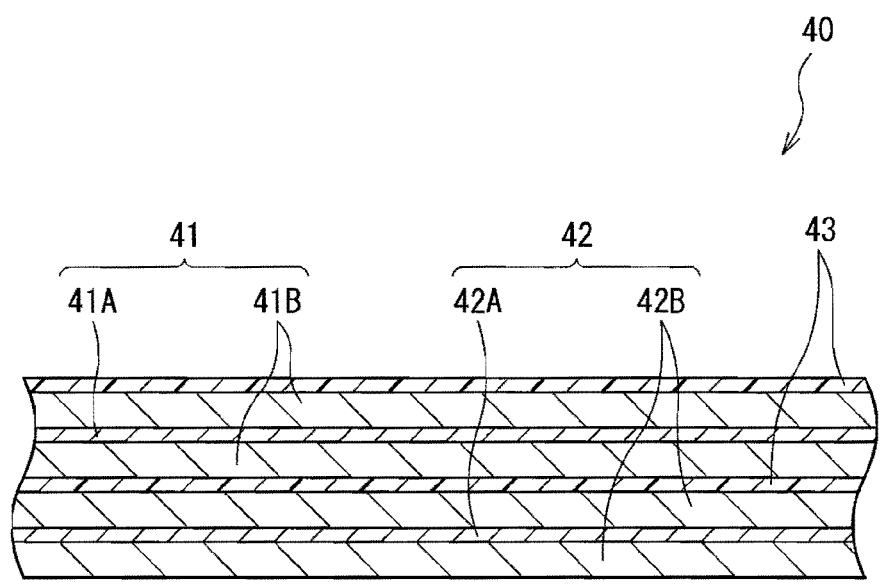
FIG. 8 is a cross sectional view illustrating an enlarged part of the spirally wound electrode body illustrated in FIG. 7.

FIG. 7 and FIG. 8 illustrate a cross sectional structure of a second secondary battery. FIG. 8 illustrates an enlarged part of a spirally wound electrode body 40 illustrated in FIG. 7. The secondary battery is, for example, a lithium ion secondary battery as the foregoing first secondary battery. The secondary battery contains the spirally wound electrode body 40 in which a cathode 41 and an anode 42 are layered with a separator 43 in between and spirally wound, and a pair of insulating plates 32 and 33 inside a battery can 31 in the shape of an approximately hollow cylinder. The battery structure including the battery can 31 is a so-called cylindrical type.

The battery can 31 is made of, for example, a metal material similar to that of the battery can 11 in the foregoing first secondary battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 through the PTC device 36. In the safety valve mechanism 35, in the case where the internal pressure becomes a certain level or more by internal short circuit, external heating or the like, a disk plate 35A flips to cut the electric connection between the battery cover 34 and the spirally wound electrode body 40. As temperature rises, the PTC device 36 increases the resistance and thereby limits a current to prevent abnormal heat generation resulting from a large current. The gasket 37 is made of, for example, an insulating material and its surface is coated with asphalt.

For example, a center pin 44 may be inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on both faces of a cathode current collector 41A. The anode 42 has a structure similar to that of the foregoing anode, for example, a structure in which an anode structure 42B is provided on both faces of an anode current collector 42A. The structures of the cathode current collector 41A, the cathode active material layer 41B, the anode current collector 42A, the anode structure 42B, and the separator 43 and the composition of the electrolytic solution are respectively similar to the structures of the cathode current collector 21A, the cathode active material layer 21B, the anode current collector 22A, the anode structure 22B, and the separator 23, and the composition of the electrolytic solution in the foregoing first secondary battery.

The secondary battery is manufactured, for example, by the following procedure.

First, for example, the cathode 41 is formed by forming the cathode active material layer 41B on both faces of the cathode current collector 41A and the anode 42 is formed by forming the anode structure 42B on both faces of the anode current collector 42A with the use of procedures similar to the procedures of forming the cathode 21 and the anode 22 in the foregoing first secondary battery. Subsequently, the cathode lead 45 is attached to the cathode 41, and the anode lead 46 is attached to the anode 42. Subsequently, the cathode 41 and the anode 42 are layered with the separator 43 in between and spirally wound, and thereby the spirally wound electrode body 40 is formed. After that, the center pin 44 is inserted in the center of the spirally wound electrode body 40. Subsequently, the spirally wound electrode body 40 is sandwiched between the pair of insulating plates 32 and 33, and contained in the battery can 31. The end of the cathode lead 45 is welded to the safety valve mechanism 35, and the end of the anode lead 46 is welded to the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery illustrated in FIG. 7 and FIG. 8 is thereby completed.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode. Thus, the cycle characteristics are able to be improved. Effects of the secondary battery other than the foregoing effects for the secondary battery are similar to those of the first battery.

Third Secondary Battery

Figure 9:
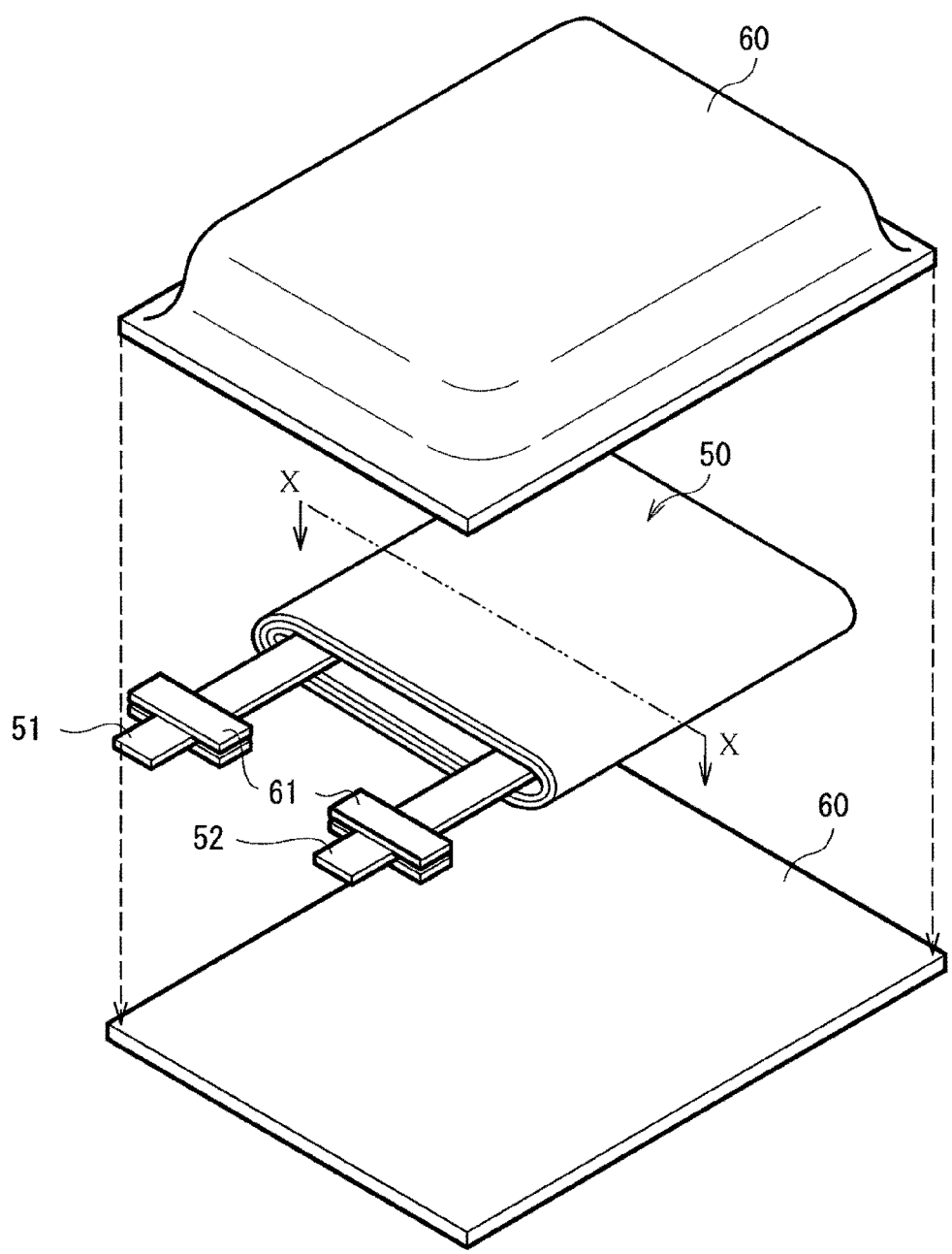
FIG. 9 is a cross sectional view illustrating a structure of a third secondary battery including the anode according to the embodiment of the invention.
Figure 10:
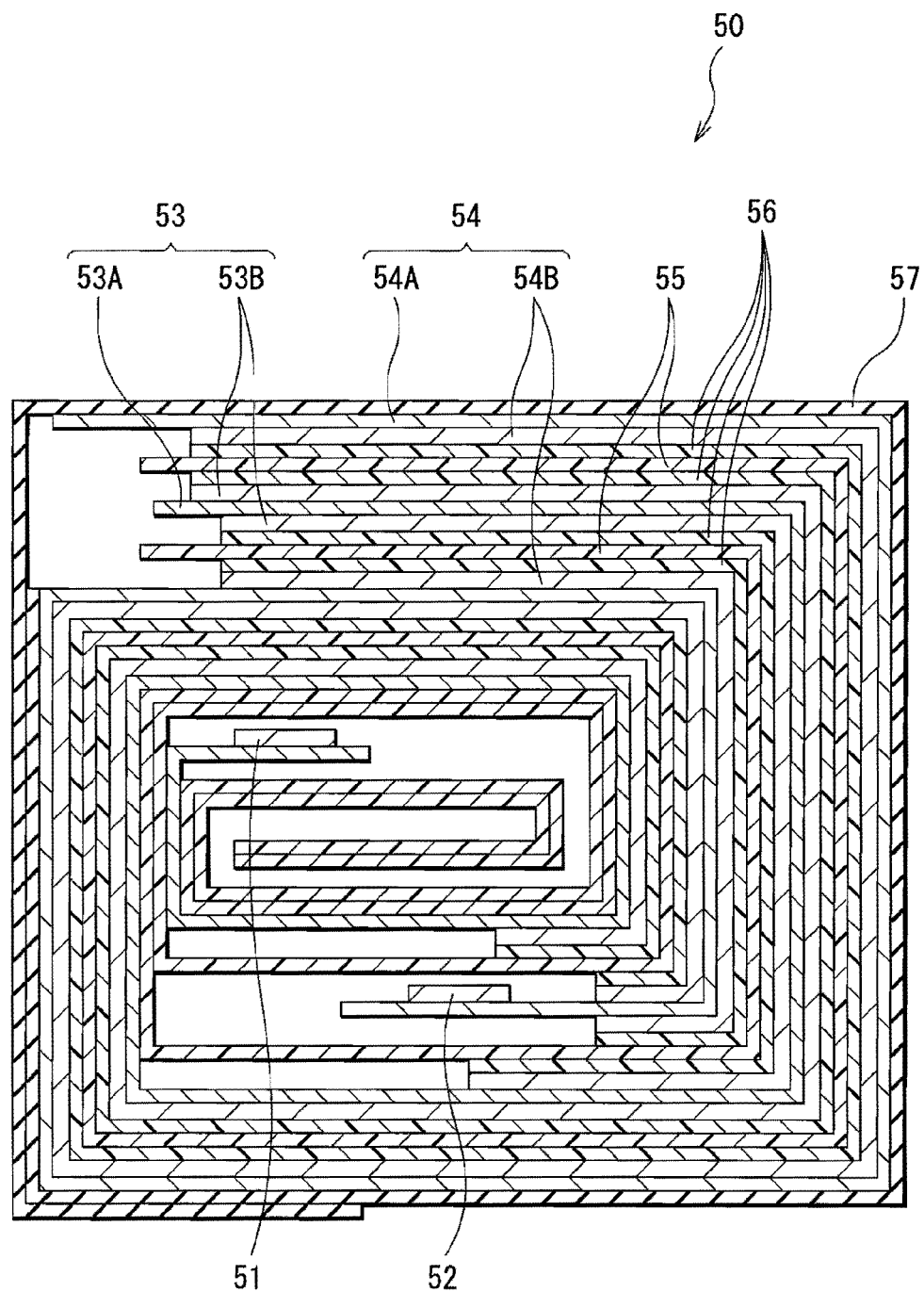
FIG. 10 is a cross sectional view taken along line X-X of the spirally wound electrode body illustrated in FIG. 9.

FIG. 9 illustrates an exploded perspective structure of a third secondary battery. FIG. 10 illustrates an enlarged cross section taken along line X-X illustrated in FIG. 9. In the secondary battery, a spirally wound electrode body 50 on which a cathode lead 51 and an anode lead 52 are attached is contained in a film package member 60. The battery structure including the package member 60 is so-called laminated film type.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. These metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded to each other by fusion bonding or an adhesive so that the polyethylene film and the spirally wound electrode body 50 are opposed to each other.

An adhesive film 61 to protect from the entering of outside air is inserted between the package member 60 and the cathode lead 51, the anode lead 52. The adhesive film 61 is made of a material having adhesion to the cathode lead 51 and the anode lead 52. Examples of such a material include a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and then are spirally wound. The outermost periphery thereof is protected by a protective tape 57.

The cathode 53 has a structure in which, for example, a cathode active material layer 53B is provided on both faces of a cathode current collector 53A. The anode 54 has a structure similar to that of the foregoing anode, for example, has a structure in which an anode structure 54B is provided on both faces of an anode current collector 54A. The structures of the cathode current collector 53A, the cathode active material layer 53B, the anode current collector 54A, the anode structure 54B, and the separator 55 are respectively similar to those of the cathode current collector 21A, the cathode active material layer 21B, the anode current collector 22A, the anode structure 22B, and the separator 23 of the foregoing first secondary battery.

The electrolyte 56 is a so-called gel electrolyte, containing an electrolytic solution and a polymer compound that holds the electrolytic solution. The gel electrolyte is preferable, since high ion conductivity (for example, 1 mS/cm or more at room temperature) is obtained and liquid leakage is prevented. The electrolyte 56 is provided, for example, between the cathode 53 and the separator 55 and between the anode 54 and the separator 55.

Examples of polymer compounds include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate and the like. One of these polymer compounds may be used singly, or two or more thereof may be used by mixture. Specially, as a polymer compound, polyacrylonitrile, polyvinylidene fluoride, polyhexafluoropropylene, or polyethylene oxide is preferable, since such a compound is electrochemically stable.

The composition of the electrolytic solution is similar to the composition of the electrolytic solution in the first secondary battery. However, in this case, the solvent means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three manufacturing methods.

In the first manufacturing method, first, for example, the cathode 53 is formed by forming the cathode active material layer 53B on both faces of the cathode current collector 53A, and the anode 54 is formed by forming the anode structure 54B on both faces of the anode current collector 54A by a procedure similar to the procedure of forming the first secondary battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is welded to the cathode current collector 53A, and the anode lead 52 is welded to the anode current collector 54A. Subsequently, the cathode 53 and the anode 54 provided with the electrolyte 56 are layered with the separator 55 in between and then are spirally wound in the longitudinal direction to obtain a laminated body. After that, the protective tape 57 is adhered to the outermost periphery thereof to form the spirally wound electrode body 50. Finally, for example, after the spirally wound electrode body 50 is sandwiched between 2 pieces of the film package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery illustrated in FIG. 9 and FIG. 10 is completed.

In the second manufacturing method, first, the cathode lead 51 is welded to the cathode 53, and the anode lead 52 is welded to the anode 54. After that, the cathode 53 and the anode 54 are layered with the separator 55 in between and spirally wound. The protective tape 57 is adhered to the outermost periphery thereof, and thereby a spirally wound body as a precursor of the spirally wound electrode body 50 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In the third manufacturing method, the spirally wound body is formed and contained in the pouch-like package member 60 in the same manner as that of the foregoing second manufacturing method, except that the separator 55 with both faces coated with a polymer compound is used firstly. Examples of polymer compounds with which the separator 55 is coated include a polymer containing vinylidene fluoride as a component, that is, a homopolymer, a copolymer, a multicomponent copolymer and the like. Specifically, examples thereof include polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like. As a polymer compound, in addition to the foregoing polymer containing vinylidene fluoride as a component, another one or more polymer compounds may be contained. Subsequently, an electrolytic solution is injected into the package member 60. After that, the opening of the package member 60 is sealed by thermal fusion bonding or the like. Finally, the resultant is heated while a weight is applied to the package member 60, and the separator 55 is contacted with the cathode 53 and the anode 54 with the polymer compound in between. Thereby, the electrolytic solution is impregnated into the polymer compound, and the polymer compound is gelated to form the electrolyte 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly remain in the electrolyte 56 compared to the second manufacturing method. In addition, the formation step of the polymer compound is favorably controlled. Thus, sufficient adhesion are obtained between the cathode 53/the anode 54/the separator 55 and the electrolyte 56.

According to the laminated film secondary battery, the anode 54 has the structure similar to that of the foregoing anode. Thus, the cycle characteristics are able to be improved. Effect of the secondary battery other than the foregoing effect is similar to that of the first battery.

EXAMPLES

Examples of the invention will be described in detail.

Example 1-1

The laminated film secondary battery illustrated in FIG. 9 and FIG. 10 was manufactured by the following procedure. At that time, the secondary battery was manufactured as a lithium ion secondary battery in which the capacity of the anode 54 was expressed based on insertion and extraction of lithium.

First, the cathode 53 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 3 parts by mass of polyvinylidene fluoride as a cathode binder, and 6 parts by mass of graphite as a cathode electrical conductor were mixed to obtain a cathode mixture. After that, the cathode mixture was dispersed in N-methyl-2-pyrrolidone to obtain paste cathode mixture slurry. Finally, both faces of the cathode current collector 53A made of a strip-shaped aluminum foil (thickness was 12 µm) were uniformly coated with the cathode mixture slurry, which was dried. After that, the resultant was compression-molded by a roll pressing machine to form the cathode active material layer 53B.

Figure 11:
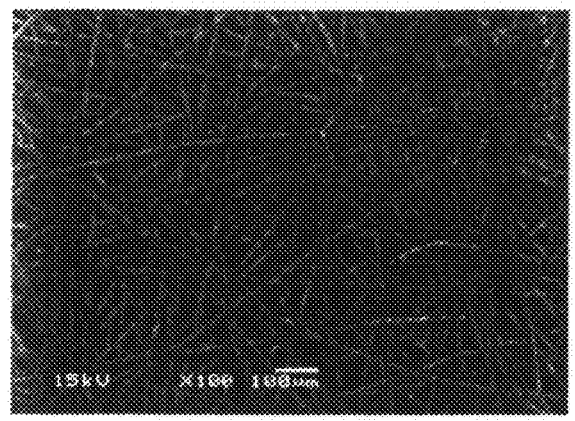
FIG. 11 is an SEM photograph illustrating an appearance of the metal fibers.

Next, the anode 54 was formed. First, the anode current collector 54A made of an electrolytic copper foil (thickness was 18 µm, arithmetic average roughness Ra of the surface was 0.2 µm) and a plurality of metal fibers made of iron (Fe) manufactured by Tomoegawa Co., Ltd. were prepared. As the metal fibers, the plurality of metal fibers having the diameter D of 15 µm, the ratio B/A of 15, and the ratio Y/X of less than 1 (Y/X<1) which were already formed into a sheet (thickness was 100 µm, porosity was 40%, and tensile strength was 38 N/mm) were used. Regarding the appearance of the plurality of metal fibers before forming the anode 54 was, as illustrated in FIG. 11, the metal fibers were connected to each other while the metal fibers were intertwined with each other and overlapped each other, and thereby the three-dimensional network structure was formed. Subsequently, a polyamic acid solution was prepared with the use of N-methyl-2-pyrrolidone and N,N-dimethylacetamide as a solvent. After that, silicon powder (median size was 5 µm) as an anode material and the polyamic acid solution as a precursor of an anode binder were mixed at a dry weight ratio of 80:20. After that, the mixture was dispersed in N-methyl-2-pyrrolidone to obtain anode mixture slurry. Subsequently, after the plurality of metal fibers forming the three-dimensional network structure were laid on a single face of the anode current collector 54A, the plurality of metal fibers were coated with the anode mixture slurry by coating method (coating device) and the resultant was dried to form a plurality of anode active material particles. Further, the plurality of anode active material particles were also formed on the opposite face of the foregoing single face of the anode current collector 54 by a similar procedure. At that time, the coating amount per unit area of the anode active material particles on each single face side of the anode current collector 54 was 2.7 mg/cm$^2$. Finally, the coating was heated (fired) in the vacuum atmosphere under conditions of 400 deg C. and 1 hour. Thereby, polyimide (PI) was generated as an anode binder, and the polyimide was carbonized. Thereby the anode structure 54B having a structure in which the plurality of anode active material particles were held by the plurality of metal fibers forming the three-dimensional network structure was formed on both faces of the anode current collector 54A.

Next, ethylene carbonate (EC) and diethyl carbonate (DEC) were mixed as a solvent. After that, lithium hexafluorophosphate (LiPF$_6$) as an electrolyte salt was dissolved in the solvent to prepare an electrolytic solution. The solvent composition (EC:DEC) was 50:50 at a weight ratio. The content of the electrolyte salt to the solvent was 1 mol/kg.

Next, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the separator 55 (thickness was 23 µm) having a 3-layer structure in which a film made of a microporous polyethylene as a main component was sandwiched between films made of a microporous polypropylene as a main component, the anode 54, and the foregoing separator 55 were layered in this order and spirally wound in the longitudinal direction. After that, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a 3-layer laminated film (total thickness was 100 µm) in which a nylon film (thickness was 30 µm), an aluminum foil (thickness was 40 µm), and a cast polypropylene film (thickness was 30 µm) were layered from the outside. After that, outer edges other than an edge of one side of the package members were thermally fusion-bonded to each other. Thereby, the spirally wound body was contained in the package members 60 in a pouched state. Subsequently, the electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film secondary battery was completed.

For the secondary battery, the anode utilization of the anode 54 was set to 50% by adjusting the ratio between the charge and discharge capacity of the cathode 53 and the charge and discharge capacity of the anode 54. Further, lithium metal was not precipitated on the anode 54 in the full charge state by adjusting the thickness of the cathode active material layer 53B.

Examples 1-2 to 1-9

A procedure was performed in the same manner as that of Example 1-1, except that as a component material of the metal fibers, titanium (Ti: Example 1-2), copper (Cu: Example 1-3), aluminum (Al: Example 1-4), zinc (Zn: Example 1-5), silver (Ag: Example 1-6), cobalt (Co: Example 1-7), nickel (Ni: Example 1-8), or chromium (Cr: Example 1-9) was used.

Comparative Example 1

A procedure was performed in the same manner as that of Example 1-1, except that the anode was formed by forming an anode active material layer instead of the anode structure 54B on the anode current collector 54A. In forming the anode active material layer, both faces of the anode current collector 54A were uniformly coated with the anode mixture slurry and the resultant was dried, and then the coating was compression-molded by a rolling press machine. The coating amount per unit area of the anode active material particles on each single face of the anode current collector 54A was similar to that of Example 1-1.

The cycle characteristics for the secondary batteries of Examples 1-1 to 1-9 and Comparative example 1 were examined. The results shown in Table 1 were obtained.

In examining the cycle characteristics, first, to stabilize the battery state, after charge and discharge were performed 1 cycle in the atmosphere at 23 deg C., charge and discharge were performed in the same atmosphere to measure the discharge capacity at the second cycle. Subsequently, the secondary battery was charged and discharged 99 cycles in the same atmosphere to measure the discharge capacity at the 101st cycle. Finally, the discharge capacity retention ratio (%)=(discharge capacity at the 101st cycle/discharge capacity at the second cycle)×100 was calculated. The charge conditions were as follows. That is, after charge was performed at the constant current density of 3 mA/cm$^2$ until the battery voltage reached 4.2 V, charge was continuously performed at the constant voltage of 4.2 V until the battery density reached 0.3 mA/cm$^2$. The discharge conditions were as follows. That is, discharge was performed at the constant current density of 3 mA/cm$^2$ until the battery voltage reached 2.5 V. Similar procedures and similar conditions in examining the cycle characteristics were applied to the after-mentioned examples and comparative examples.

Figure 12:
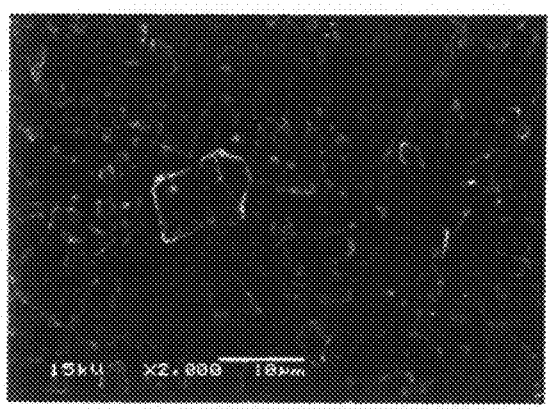
FIG. 12 is an SEM photograph illustrating a surface structure of an anode in a secondary battery of Example 1-1.
Figure 13:
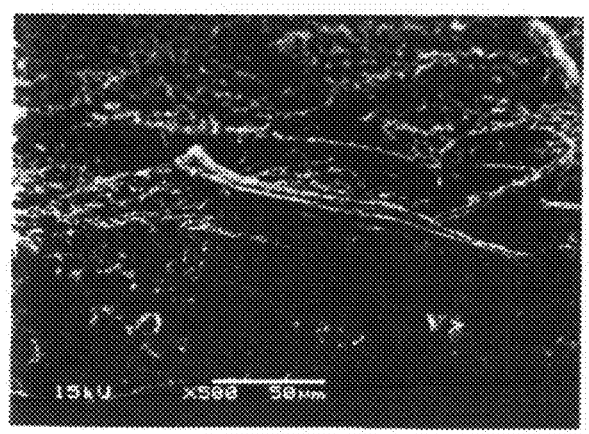
FIG. 13 is an SEM photograph illustrating a surface structure and a cross sectional structure of the anode in the secondary battery of Example 1-1.

In particular, for Example 1-1, in addition to examining the cycle characteristics, the structure of the anode 54 was observed by SEM. The observation results are illustrated in FIG. 12 and FIG. 13. FIG. 12 illustrates a surface structure of the anode 54, and FIG. 13 illustrates a surface structure (upper half) and a cross sectional structure (lower half) of the anode 54. However, FIG. 12 and FIG. 13 illustrate a state that the anode current collector 54A was removed from the anode 54.

three-dimensional network structure. In this case, most of the plurality of anode active material particles was contained in the three-dimensional network structure.

As show in Table 1, in Examples 1-1 to 1-9 including the anode structure 54B in which the plurality of anode active material particles were held by the plurality of metal fibers forming the three-dimensional network structure, the discharge capacity retention ratio was higher than that of Comparative example 1 not including the anode structure 54B irrespective of the component material type of the metal fibers. The result showed that since the plurality of metal fibers formed the three-dimensional network structure, sufficient conductive paths are obtained among the plurality of anode active material particles, and thus current collectivity was improved.

In particular, in Examples 1-1 to 1-9, in the case where iron, titanium, cobalt, nickel, or chromium was used, the discharge capacity retention ratio was higher than that in the case where other material such as copper was used, and a discharge capacity retention ratio of 80% or more was obtained.

Accordingly, it was confirmed that in the secondary battery of the invention, in the case where the anode active material particles were silicon, and the anode structure 54B of the anode 54 had the structure in which the plurality of anode active material particles were held by the plurality of metal fibers forming the three-dimensional network structure, the cycle characteristics were improved. It was also confirmed that in this case, in the case where iron, titanium, cobalt, nickel, or chromium was used as a component material of the metal fibers, the characteristics were further improved.

Examples 2-1 to 2-13

A procedure was performed in the same manner as that of Example 1-1, except that the diameter D of the metal fibers was 0.1 μm (Example 2-1), 0.3 μm (Example 2-2), 0.5 μm (Example 2-3), 1 μm (Example 2-4), 2 μm (Example 2-5), 5 μm (Example 2-6), 10 μm (Example 2-7), 20 μm (Example 2-8), 30 μm (Example 2-9), 40 μm (Example 2-10), 50 μm (Example 2-11), 60 μm (Example 2-12), or 70 μm (Example 2-13).

The cycle characteristics for the secondary batteries of Examples 2-1 to 2-13 were examined. The results shown in Table 2 and FIG. 14 were obtained.

TABLE 1

Anode active material: silicon

| | Anode current collector | Metal fiber Type | Metal fiber Diameter D (μm) | Metal fiber Ratio B/A | Anode active material particles Median size (μm) | Anode binder | Discharge capacity retention ratio (%) |
|---|---|---|---|---|---|---|---|
| Example 1-1 | Cu | Fe | 15 | 15 | 5 | PI | 80 |
| Example 1-2 | | Ti | | | | | 81 |
| Example 1-3 | | Cu | | | | | 79 |
| Example 1-4 | | Al | | | | | 75 |
| Example 1-5 | | Zn | | | | | 74 |
| Example 1-6 | | Ag | | | | | 74 |
| Example 1-7 | | Co | | | | | 80 |
| Example 1-8 | | Ni | | | | | 81 |
| Example 1-9 | | Cr | | | | | 81 |
| Comparative example 1 | Cu | — | — | — | 5 | PI | 32 |

As illustrated in FIG. 12 and FIG. 13, in the anode 54 of Example 1-1, as described with reference to the schematic view illustrated in FIG. 2, it was observed that the plurality of metal fibers were connected to each other and partially intertwined with each other, and thereby the three-dimensional network structure was formed, and accordingly the plurality of anode active material particles were held by the

TABLE 2

Anode active material: silicon

| | Anode current collector | Metal fiber Type | Diameter D (μm) | Ratio B/A | Anode active material particles Median size (μm) | Anode binder | Discharge capacity retention ratio (%) |
|---|---|---|---|---|---|---|---|
| Example 2-1 | Cu | Fe | 0.1 | 15 | 5 | PI | 40 |
| Example 2-2 | | | 0.3 | | | | 42 |
| Example 2-3 | | | 0.5 | | | | 70 |
| Example 2-4 | | | 1 | | | | 72 |
| Example 2-5 | | | 2 | | | | 75 |
| Example 2-6 | | | 5 | | | | 78 |
| Example 2-7 | | | 10 | | | | 79 |
| Example 1-1 | | | 15 | | | | 80 |
| Example 2-8 | | | 20 | | | | 81 |
| Example 2-9 | | | 30 | | | | 82 |
| Example 2-10 | | | 40 | | | | 82 |
| Example 2-11 | | | 50 | | | | 82 |
| Example 2-12 | | | 60 | | | | 82 |
| Example 2-13 | | | 70 | | | | 82 |
| Comparative example 1 | Cu | — | — | — | 5 | PI | 32 |

As shown in Table 2, in Examples 2-1 to 2-13 in which the diameter D of the metal fibers was changed, the discharge capacity retention ratio was higher than that of Comparative example 1 as in Example 1-1 irrespective of a value of the diameter D.

Figure 14:
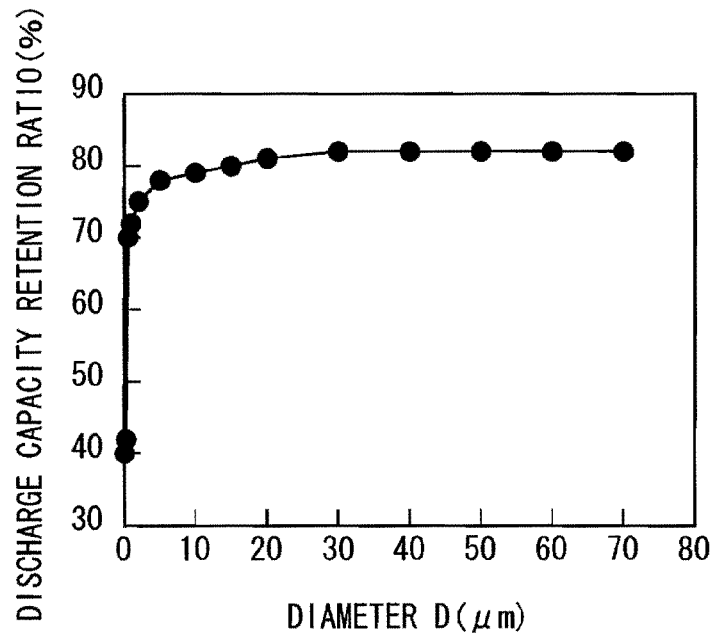
FIG. 14 is a diagram illustrating a correlation between diameter D and a discharge capacity retention ratio.

In particular, in Examples 1-1 and 2-1 to 2-13, as shown in Table 2 and FIG. 14, there was a tendency that as the diameter D was increased, the discharge capacity retention ratio was increased and then became constant. In this case, when the diameter D became 0.5 μm or more, the discharge capacity retention ratio was largely increased and a discharge capacity retention ratio of 70% or more was obtained. However, when the diameter D became over 50 μm, the occupation ratio of the metal fibers in the anode structure 54B became larger than the occupation ratio of the anode active material particles, and thus there was a tendency that the battery capacity was lowered in the allowable range while a high discharge capacity retention ratio was obtained.

Accordingly, it was confirmed that in the secondary battery of the embodiment of the invention, in the case where the diameter D of the metal fibers was changed, the cycle characteristics were improved as well. It was also confirmed that in this case, in the case where the diameter D was 0.5 μm or more, the cycle characteristics were further improved, and in the case where the diameter D was from 0.5 μm to 50 μm both inclusive, a high battery capacity was obtained.

Examples 3-1 to 3-13

A procedure was performed in the same manner as that of Example 1-1, except that the ratio B/A of the metal fibers was 1 (Example 3-1), 1.3 (Example 3-2), 1.5 (Example 3-3), 1.8 (Example 3-4), 2 (Example 3-5), 10 (Example 3-6), 100 (Example 3-7), 200 (Example 3-8), 500 (Example 3-9), 1000 (Example 3-10), 3000 (Example 3-11), 5000 (Example 3-12), or 10000 (Example 3-13).

The cycle characteristics for the secondary batteries of Examples 3-1 to 3-13 were examined. The results shown in Table 3 and FIG. 15 were obtained.

TABLE 3

Anode active material: silicon

| | Anode current collector | Metal fiber Type | Diameter D (μm) | Ratio B/A | Anode active material particles Median size (μm) | Anode binder | Discharge capacity retention ratio (%) |
|---|---|---|---|---|---|---|---|
| Example 3-1 | Cu | Fe | 15 | 1 | 15 | PI | 55 |
| Example 3-2 | | | | 1.3 | | | 57 |
| Example 3-3 | | | | 1.5 | | | 60 |
| Example 3-4 | | | | 1.8 | | | 65 |
| Example 3-5 | | | | 2 | | | 72 |
| Example 3-6 | | | | 10 | | | 77 |
| Example 1-1 | | | | 15 | | | 80 |

TABLE 3-continued

| | Anode active material: silicon | | | | | |
|---|---|---|---|---|---|---|
| | Anode current collector | Metal fiber Type | Diameter D (μm) | Ratio B/A | Anode active material particles Median size (μm) | Anode binder | Discharge capacity retention ratio (%) |
| Example 3-7 | | | | 100 | | | 81 |
| Example 3-8 | | | | 200 | | | 82 |
| Example 3-9 | | | | 500 | | | 83 |
| Example 3-10 | | | | 1000 | | | 84 |
| Example 3-11 | | | | 3000 | | | 85 |
| Example 3-12 | | | | 5000 | | | 86 |
| Example 3-13 | | | | 10000 | | | 86 |
| Comparative example 1 | Cu | — | — | — | 5 | PI | 32 |

As shown in Table 3, in Examples 3-1 to 3-13 in which the ratio B/A of the metal fibers was changed, the discharge capacity retention ratio was higher than that of Comparative example 1 as in Example 1-1 irrespective of a value of the ratio B/A.

Figure 15:
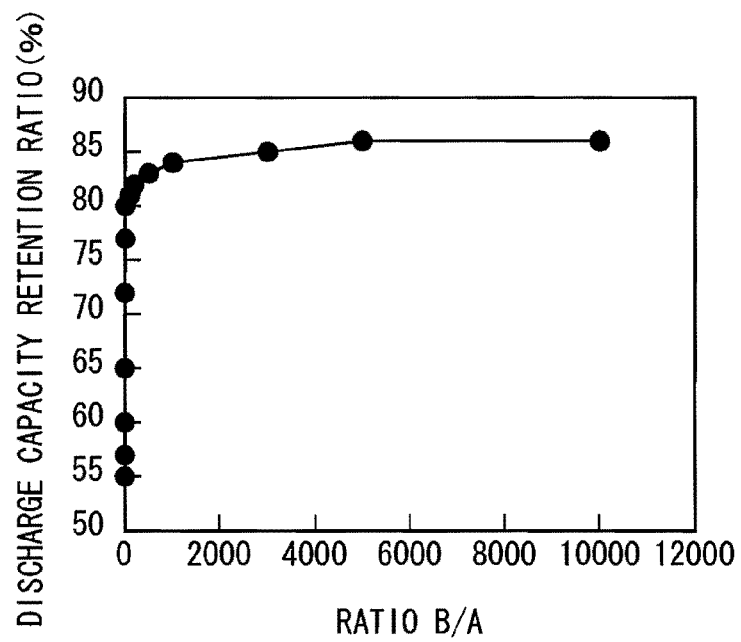
FIG. 15 is a diagram illustrating a correlation between ratio B/A and a discharge capacity retention ratio.

In particular, in Examples 1-1 and 3-1 to 3-13, as shown in Table 3 and FIG. 15, there was a tendency that as the ratio B/A of the metal fibers was increased, the discharge capacity retention ratio was increased and then became constant. In this case, when the ratio B/A became 2 or more, the discharge capacity retention ratio was increased and a discharge capacity retention ratio of 70% or more was obtained.

Accordingly, it was confirmed that in the secondary battery of the embodiment of the invention, in the case where the ratio B/A of the metal fibers was changed, the cycle characteristics were improved as well. It was also confirmed that if the ratio B/A was 2 or more, the characteristics were further improved.

Examples 4-1 to 4-3

A procedure was performed in the same manner as that of Example 1-1, except that the diameter D of the metal fibers was 10 μm, and the ratio B/A was 10 (Example 4-1), 100 (Example 4-2), or 200 (Example 4-3).

Examples 4-4 to 4-6

A procedure was performed in the same manner as that of Example 1-1, except that the diameter D of the metal fibers was 20 μm, and the ratio B/A was 10 (Example 4-4), 100 (Example 4-5), or 200 (Example 4-6).

Examples 4-7 to 4-9

A procedure was performed in the same manner as that of Example 1-2, except that the diameter D of the metal fibers was 10 μm, and the ratio B/A was 10 (Example 4-7), 100 (Example 4-8), or 200 (Example 4-9).

Examples 4-10 and 4-11

A procedure was performed in the same manner as that of Example 1-3, except that the diameter D of the metal fibers was 20 μm, and the ratio B/A was 10 (Example 4-10) or 100 (Example 4-11).

Examples 4-12 and 4-13

A procedure was performed in the same manner as that of Example 1-8, except that the diameter D of the metal fibers was 20 μm, and the ratio B/A was 10 (Example 4-12) or 100 (Example 4-13).

Examples 4-14 and 4-15

A procedure was performed in the same manner as that of Example 1-9, except that the diameter D of the metal fibers was 20 μm, and the ratio B/A was 10 (Example 4-14) or 100 (Example 4-15).

The cycle characteristics for the secondary batteries of Examples 4-1 to 4-15 were examined. The results shown in Table 4 were obtained.

TABLE 4

| | Anode active material: silicon | | | | | | |
|---|---|---|---|---|---|---|---|
| | Anode current collector | Metal fiber Type | Diameter D (μm) | Ratio B/A | Anode active material particles Median size (μm) | Anode binder | Discharge capacity retention ratio (%) |
| Example 4-1 | Cu | Fe | 10 | 10 | 5 | PI | 75 |
| Example 4-2 | | | | 100 | | | 79 |

TABLE 4-continued

Anode active material: silicon

| | Anode current collector | Metal fiber Type | Metal fiber Diameter D (μm) | Metal fiber Ratio B/A | Anode active material particles Median size (μm) | Anode binder | Discharge capacity retention ratio (%) |
|---|---|---|---|---|---|---|---|
| Example 4-3 | | | | 200 | | | 80 |
| Example 4-4 | | | 20 | 10 | | | 79 |
| Example 4-5 | | | | 100 | | | 82 |
| Example 4-6 | | | | 200 | | | 83 |
| Example 4-7 | | Ti | 10 | 10 | 5 | PI | 79 |
| Example 4-8 | | | | 100 | | | 80 |
| Example 4-9 | | | | 200 | | | 81 |
| Example 4-10 | | Cu | 20 | 10 | 5 | PI | 80 |
| Example 4-11 | | | | 100 | | | 81 |
| Example 4-12 | | Ni | 20 | 10 | 5 | PI | 81 |
| Example 4-13 | | | | 100 | | | 82 |
| Example 4-14 | | Cr | 20 | 10 | 5 | PI | 81 |
| Example 4-15 | | | | 100 | | | 82 |
| Comparative example 1 | Cu | — | — | — | 5 | PT | 32 |

As shown in Table 4, in Examples 4-1 to 4-15 in which the component material, the diameter D, and the ratio B/A of the metal fibers were changed, results similar to those of Table 1 to Table 3 were obtained. That is, in Examples 4-1 to 4-15, the discharge capacity retention ratio was higher than that of Comparative example 1 irrespective of the component material type, a value of the diameter D, and a value of the ratio B/A of the metal fibers.

Accordingly, it was confirmed that in the secondary battery of the embodiment of the invention, in the case where the component material, the diameter D, and the ratio B/A of the metal fibers were changed, the cycle characteristics were improved as well.

Examples 5-1 and 5-2

A procedure was performed in the same manner as that of Example 1-1, except that the ratio Y/X of the metal fibers was 1 (Y/X=1: Example 5-1) or over 1 (Y/X>1: Example 5-2).

The cycle characteristics for the secondary batteries of Examples 5-1 and 5-2 were examined. The results shown in Table 5 were obtained.

For the secondary batteries of Examples 1-1, 5-1, and 5-2, in addition to the cycle characteristics, stability of the battery performance (voltage drop generation status) was examined. In examining the stability of the battery performance, determination was made as follows. After secondary batteries in a state of being charged up to 4.1 V were left for 2 weeks, a case in which the battery voltage was 4.0 V or more (voltage drop was within 0.1 V) was determined as "voltage drop not generated," and a case in which the battery voltage was under 4.0 V (voltage drop was over 0.1 V) was determined as "voltage drop generated." At that time, the number of measurement n was 100 pcs, and voltage drop generation ratio (%)=(number of voltage drop generation/100 pcs)×100 was calculated.

TABLE 5

Anode active material: silicon

| | Anode current collector | Metal fiber Type | Metal fiber Diameter D (μm) | Metal fiber Ratio B/A | Metal fiber Ratio Y/X | Anode active material particles Median size (μm) | Anode electrical conductor | Discharge capacity retention ratio (%) | Voltage drop generation ratio (%) |
|---|---|---|---|---|---|---|---|---|---|
| Example 1-1 | Cu | Fe | 15 | 15 | <1 | 5 | PI | 80 | 1 |
| Example 5-1 | | | | | 1 | | | 80 | 5 |
| Example 5-2 | | | | | >1 | | | 79 | 15 |
| Comparative example 1 | Cu | — | — | — | — | 5 | PI | 32 | 1 |

As shown in Table 5, in Examples 5-1 and 5-2 in which the ratio Y/X of the metal fibers was changed to 1 or the like, the discharge capacity retention ratio was higher than that of Comparative example 1 as in Example 1-1 irrespective of a value of the ratio Y/X.

In particular, in Examples 1-1, 5-1, and 5-2, while the discharge capacity retention ratio was almost equal to each other, the voltage drop generation ratio was significantly lower in the case where the ratio Y/X was under 1 than those in the other cases. The result showed that in the case where the ratio Y/X was under 1, that is, the metal fibers existed almost in the spirally winding direction of the spirally wound electrode body 50, the number of connecting points among the metal fibers became large in such a direction, and thus voltage drop was less likely to generate.

Accordingly, it was confirmed that in the secondary battery of the embodiment of the invention, in the case where the ratio Y/X of the metal fibers was changed, the cycle characteristics were improved as well. It was also confirmed that if the ratio Y/X was under 1, the battery performance was stably obtained.

Examples 6-1 to 6-16

A procedure was performed in the same manner as that of Example 1-1, except that the median size of the anode active material particles was 0.05 µm (Example 6-1), 0.1 µm (Example 6-2), 0.5 µm (Example 6-3), 1 µm (Example 6-4), 2 µm (Example 6-5), 3 µm (Example 6-6), 4 µm (Example 6-7), 8 µm (Example 6-8), 10 µm (Example 6-9), 13 µm (Example 6-10), 15 µm (Example 6-11), 20 µm (Example 6-12), 25 µm (Example 6-13), 30 µm (Example 6-14), 35 µm (Example 6-15), or 40 µm (Example 6-16).

The cycle characteristics for the secondary batteries of Examples 6-1 to 6-16 were examined. The results shown in Table 6 and FIG. 16 were obtained.

As shown in Table 6, in Examples 6-1 to 6-16 in which the median size of the anode active material particles was changed, the discharge capacity retention ratio was higher than that of Comparative example 1 as in Example 1-1 irrespective of a value of the median size.

Figure 16:
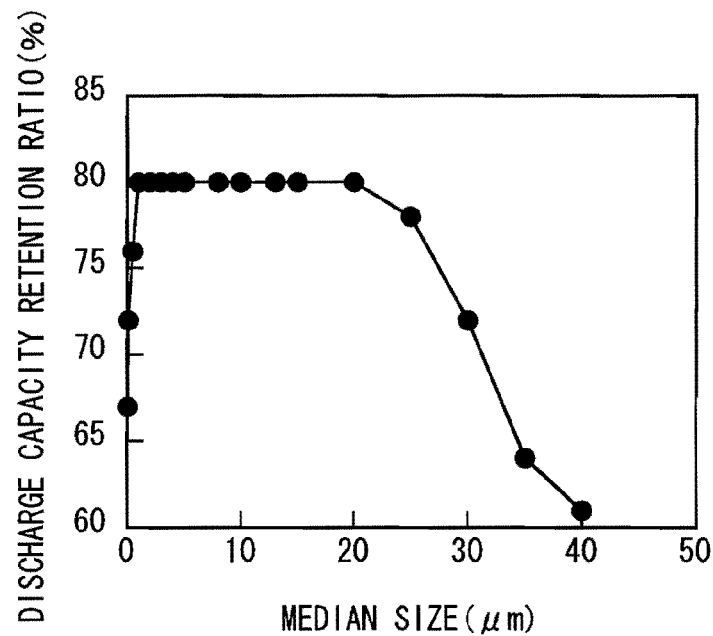
FIG. 16 is a diagram illustrating a correlation between median size and a discharge capacity retention ratio.

In particular, in Examples 1-1 and 6-1 to 6-16, as shown in Table 6 and FIG. 16, there was a tendency that as the median size was increased, the discharge capacity retention ratio was increased and then decreased. In this case, when the median size was 0.1 µm to 30 µm both inclusive, the discharge capacity retention ratio of 70% or more was obtained, and when the median size was 1 µm to 20 µm both inclusive, the discharge capacity retention ratio of 80% or more was obtained.

Accordingly, it was confirmed that in the secondary battery of the embodiment of the invention, in the case where the median size of the anode active material particles was changed, the cycle characteristics were improved as well. It was also confirmed that when the median size was 0.1 µm to 30 µm both inclusive, or more particularly 1 µm to 20 µm both inclusive, the characteristics were further improved.

Examples 7-1 to 7-5

A procedure was performed in the same manner as that of Example 1-1, except that a silicon compound was used instead of the silicon powder as an anode material. In forming the silicon compound, silicon powder (median size was 50 µm) and the other metal element powder (median size was 5 µm) were mixed, and the mixture was reacted while being pulverized by a planetary ball mill. As a metal element other than silicon, iron (Example 7-1), cobalt (Example 7-2), nickel (Example 7-3), titanium (Example 7-4), or copper (Example 7-5) was used, and the content of the metal elements was 5 atomic %.

The cycle characteristics for the secondary batteries of Examples 7-1 to 7-5 were examined. The results shown in Table 7 were obtained.

TABLE 6

Anode active material: silicon

| | Anode current collector | Metal fiber Type | Metal fiber Diameter D (µm) | Metal fiber Ratio B/A | Anode active material particles Median size (µm) | Anode binder | Discharge capacity retention ratio (%) |
|---|---|---|---|---|---|---|---|
| Example 6-1 | Cu | Fe | 15 | 15 | 0.05 | PI | 67 |
| Example 6-2 | | | | | 0.1 | | 72 |
| Example 6-3 | | | | | 0.5 | | 76 |
| Example 6-4 | | | | | 1 | | 80 |
| Example 6-5 | | | | | 2 | | 80 |
| Example 6-6 | | | | | 3 | | 80 |
| Example 6-7 | | | | | 4 | | 80 |
| Example 1-1 | | | | | 5 | | 80 |
| Example 6-8 | | | | | 8 | | 80 |
| Example 6-9 | | | | | 10 | | 80 |
| Example 6-10 | | | | | 13 | | 80 |
| Example 6-11 | | | | | 15 | | 80 |
| Example 6-12 | | | | | 20 | | 80 |
| Example 6-13 | | | | | 25 | | 78 |
| Example 6-14 | | | | | 30 | | 72 |
| Example 6-15 | | | | | 35 | | 64 |
| Example 6-16 | | | | | 40 | | 61 |
| Comparative example 1 | Cu | — | — | — | 5 | PI | 32 |

TABLE 7

Anode active material: silicon

| | Anode current collector | Metal fiber Type | Metal fiber Diameter D (μm) | Metal fiber Ratio B/A | Anode active material particles Median size (μm) | Anode active material particles Metal element | Anode binder | Discharge capacity retention ratio (%) |
|---|---|---|---|---|---|---|---|---|
| Example 1-1 | Cu | Fe | 15 | 15 | 5 | — | PI | 80 |
| Example 7-1 | | | | | | Fe | | 83 |
| Example 7-2 | | | | | | Co | | 84 |
| Example 7-3 | | | | | | Ni | | 83 |
| Example 7-4 | | | | | | Ti | | 85 |
| Example 7-5 | | | | | | Cu | | 83 |
| Comparative example 1 | Cu | — | — | — | 5 | — | PI | 32 |

As shown in Table 7, in Examples 7-1 to 7-5 in which the anode active material particles were the silicon compound, the discharge capacity retention ratio was higher than that of Comparative example 1 as in Example 1-1 irrespective of the metal element type.

In particular, in Examples 7-1 to 7-5 in which the metal element was contained, the discharge capacity retention ratio was higher than that of Example 1-1 in which the metal element was not contained.

Accordingly, it was confirmed that in the secondary battery of the embodiment of the invention, in the case where the anode active material particles were the silicon compound, the cycle characteristics were improved as well. It was also confirmed that when the silicon compound was used, the characteristics were further improved.

Example 8-1

A procedure was performed in the same manner as that of Example 1-1, except that sputtering method was used as a method of forming the anode active material particles. At that time, RF magnetron sputtering method was used, silicon with purity 99.9% was used as a sputtering source, argon (Ar) was used as sputtering gas, a pressure in a chamber was 0.4 Pa, and the deposition rate was 2 nm/sec.

Example 8-2

A procedure was performed in the same manner as that of Example 1-1, except that evaporation method was used as a method of forming the anode active material particles. At that time, silicon with purity 99% was used as an evaporation source, and the deposition rate was 20 nm/sec.

Example 8-3

A procedure was performed in the same manner as that of Example 1-1, except that spraying method was used as a method of forming the anode active material particles. At that time, low temperature spraying method was performed by using silicon powder (median size was 2 μm) with purity 99%.

Comparative Examples 8-1 to 8-3

A procedure was performed in the same manner as that of Examples 8-1 to 8-3, except that the anode was formed by forming the anode active material layer on the anode current collector 54A as in Comparative example 1.

The cycle characteristics for the secondary batteries of Examples 8-1 to 8-3 and Comparative examples 8-1 to 8-3 were examined. The results shown in Table 8 were obtained.

TABLE 8

Anode active material: silicon

| | Anode current collector | Metal fiber Type | Metal fiber Diameter D (μm) | Ratio B/A | Anode active material particles Forming method | Anode binder | Discharge capacity retention ratio (%) |
|---|---|---|---|---|---|---|---|
| Example 1-1 | Cu | Fe | 15 | 15 | Coating method | PI | 80 |
| Example 8-1 | | | | | Sputtering method | — | 79 |
| Example 8-2 | | | | | Evaporation method | — | 80 |
| Example 8-3 | | | | | Spraying method | — | 80 |
| Comparative example 1 | Cu | — | — | — | Coating method | PI | 32 |
| Comparative example 8-1 | | | | | Sputtering method | — | 54 |
| Comparative example 8-2 | | | | | Evaporation method | — | 56 |

TABLE 8-continued

| | Anode active material: silicon | | | | | |
|---|---|---|---|---|---|---|
| | Anode current collector | Metal fiber | | | Anode active material particles Forming method | Anode binder | Discharge capacity retention ratio (%) |
| | | Type | Diameter D (μm) | Ratio B/A | | | |
| Comparative example 8-3 | | | | | Spraying method | — | 44 |

As shown in Table 8, in Examples 8-1 to 8-3 in which the method of forming the anode active material particles was changed, the discharge capacity retention ratio was higher than that of Comparative example 1 as in Example 1-1 irrespective of a forming method of the anode active material particles. In this case, in Examples 1-1 and 8-1 to 8-3, the discharge capacity retention ratio was almost equal to each other.

Accordingly, it was confirmed that in the secondary battery of the embodiment of the invention, in the case where the method of forming the anode active material particles was changed, the cycle characteristics were improved as well.

Examples 9-1 to 9-5

A procedure was performed in the same manner as that of Examples 3-1, 3-6, 1-1, 3-7, and 3-8 except that a polyamide solution was used instead of the polyamic acid solution, and polyamide (PA) was generated as an anode binder.

Examples 9-6 to 9-10

A procedure was performed in the same manner as that of Examples 3-1, 3-6, 1-1, 3-7, and 3-8 except that a polyamideimide solution was used instead of the polyamic acid solution, and polyamideimide (PAI) was generated as an anode binder.

Examples 9-11 to 9-14

A procedure was performed in the same manner as that of Examples 3-1, 1-1, 3-7, and 3-8 except that polyvinylidene fluoride (PVDF) was used as an anode binder.

The cycle characteristics for the secondary batteries of Examples 9-1 to 9-14 were examined. The results shown in Table 9 were obtained.

TABLE 9

| | Anode active material: silicon | | | | | | |
|---|---|---|---|---|---|---|---|
| | Anode current collector | Metal fiber | | | Anode active material particles Median size (μm) | Anode binder | Discharge capacity retention ratio (%) |
| | | Type | Diameter D (μm) | Ratio B/A | | | |
| Example 3-1 | Cu | Fe | 15 | 1 | 5 | PI | 55 |
| Example 3-6 | | | | 10 | | | 77 |
| Example 1-1 | | | | 15 | | | 80 |
| Example 3-7 | | | | 100 | | | 81 |
| Example 3-8 | | | | 200 | | | 82 |
| Example 9-1 | Cu | Fe | 15 | 1 | 5 | PA | 52 |
| Example 9-2 | | | | 10 | | | 73 |
| Example 9-3 | | | | 15 | | | 78 |
| Example 9-4 | | | | 100 | | | 76 |
| Example 9-5 | | | | 200 | | | 78 |
| Example 9-6 | Cu | Fe | 15 | 1 | 5 | PAI | 55 |
| Example 9-7 | | | | 10 | | | 76 |
| Example 9-8 | | | | 15 | | | 79 |
| Example 9-9 | | | | 100 | | | 78 |
| Example 9-10 | | | | 200 | | | 80 |
| Example 9-11 | Cu | Fe | 15 | 1 | 5 | PVDF | 50 |
| Example 9-12 | | | | 15 | | | 72 |
| Example 9-13 | | | | 100 | | | 76 |
| Example 9-14 | | | | 200 | | | 79 |
| Comparative example 1 | Cu | — | — | — | 5 | PI | 32 |

As shown in Table 9, in Examples 9-1 to 9-14 in which the type of the anode binder was changed, the discharge capacity retention ratio was higher than that of Comparative example 1 as in Examples 1-1, 3-1, and 3-6 to 3-8 irrespective of anode binder type.

In particular, in Examples 1-1, 3-1, 3-6 to 3-8, and 9-1 to 9-14, in the case of using PI or the like, the discharge capacity retention ratio was higher than that in the case of using PVDF. The result showed that PI or the like was more advantageous than PVDF to improve the discharge capacity retention ratio.

Accordingly, it was confirmed that in the secondary battery of the embodiment of the invention, in the case where the anode binder type was changed, the cycle characteristics were improved as well. It was also confirmed that in the case where polyimide, polyamide, or polyamideimide was used as an anode binder, the cycle characteristics were further improved.

Examples 10-1 to 10-3

A procedure was performed in the same manner as that of Examples 3-6, 1-1, and 3-7, except that scale-like artificial graphite (median size was 5 μm) was added as an anode electrical conductor. At this time, the additive amount of the artificial graphite was 10 wt %. "10 wt %" was a ratio where the total of the anode active material particles, the anode binder, and the anode electrical conductor was 100 wt %.

Examples 10-4 to 10-6

A procedure was performed in the same manner as that of Examples 3-6, 1-1, and 3-7, except that carbon black (median size was 5 μm) was added as an anode electrical conductor. The additive amount of the carbon black was 2 wt %. "2 wt %" was a ratio where the total of the anode active material particles, the anode binder, and the anode electrical conductor was 100 wt %.

Comparative Examples 10-1 to 10-3

A procedure was performed in the same manner as that of Examples 10-1 to 10-3, except that the anode active material layer was formed on the anode current collector 54A as in Comparative example 1, and scale-like artificial graphite (median size was 5 μm) was added as an anode electrical conductor, and thereby the anode was formed. The additive amount of the artificial graphite was 10 wt % (Comparative example 10-1), 20 wt % (Comparative example 10-2), or 30 wt % (Comparative example 10-3).

Comparative Examples 10-4 to 10-6

A procedure was performed in the same manner as that of Examples 10-4 to 10-6, except that the anode active material layer was formed on the anode current collector 54A as in Comparative example 1, and carbon black (median size was 5 μm) was added as an anode electrical conductor, and thereby the anode was formed. The additive amount of the carbon black was 10 wt % (Comparative example 10-4), 20 wt % (Comparative example 10-5), or 30 wt % (Comparative example 10-6).

Comparative Examples 10-7 to 10-9

A procedure was performed in the same manner as that of Examples 3-6, 1-1, and 3-7, except that the anode active material layer was formed on the anode current collector 54A as in Comparative example 1, and vapor growth carbon fiber (VGCF) was used instead of artificial graphite as an anode electrical conductor. The additive amount of the VGCF was 10 wt % (Comparative example 10-7), 20 wt % (Comparative example 10-8), or 30 wt % (Comparative example 10-9).

The cycle characteristics for the secondary batteries of Examples 10-1 to 10-9 and Comparative examples 10-1 to 10-9 were examined. The results shown in Table 10 were obtained.

TABLE 10

Anode active material: silicon

| | Anode current collector | Metal fiber Type | Metal fiber Diameter D (μm) | Metal fiber Ratio B/A | Anode active material particles Median size (μm) | Anode binder | Anode electrical conductor Type | Anode electrical conductor Content (wt %) | Discharge capacity retention ratio (%) |
|---|---|---|---|---|---|---|---|---|---|
| Example 3-6 | Cu | Fe | 15 | 10 | 5 | PI | — | — | 77 |
| Example 1-1 | | | | 15 | | | | | 80 |
| Example 3-7 | | | | 100 | | | | | 81 |
| Example 10-1 | Cu | Fe | 15 | 10 | 5 | PI | Artificial graphite | 10 | 80 |
| Example 10-2 | | | | 15 | | | | | 82 |
| Example 10-3 | | | | 100 | | | | | 83 |
| Example 10-4 | Cu | Fe | 15 | 10 | 5 | PI | Carbon black | 2 | 80.5 |
| Example 10-5 | | | | 15 | | | | | 81 |
| Example 10-6 | | | | 100 | | | | | 82 |
| Comparative Example 1 | Cu | — | — | — | 5 | PI | — | — | 32 |
| Comparative Example 10-1 | Cu | — | — | — | 5 | PI | Artificial graphite | 10 | 34 |
| Comparative Example 10-2 | | | | | | | | 20 | 35 |
| Comparative Example 10-3 | | | | | | | | 30 | 35 |
| Comparative Example 10-4 | Cu | — | — | — | 5 | PI | Carbon black | 10 | 33 |

TABLE 10-continued

| | Anode active material: silicon | | | | | | | |
|---|---|---|---|---|---|---|---|---|
| | Anode current collector | Metal fiber | | Anode active material particles Median size (μm) | Anode binder | Anode electrical conductor | | Discharge capacity retention ratio (%) |
| | | Type | Diameter D (μm) | Ratio B/A | | | Type | Content (wt %) | |
| Comparative Example 10-5 | | | | | | | | 20 | 35 |
| Comparative Example 10-6 | | | | | | | | 30 | 35 |
| Comparative Example 10-7 | Cu | — | — | — | 5 | PI | VGCF | 10 | 35 |
| Comparative Example 10-8 | | | | | | | | 20 | 36 |
| Comparative Example 10-9 | | | | | | | | 30 | 36 |

As shown in Table 10, in Examples 10-1 to 10-6 in which the anode electrical conductor was added, the discharge capacity retention ratio was higher than that of Comparative example 1 as in Example 1-1 and the like irrespective of the type of the anode electrical conductor.

In particular, in Examples 10-1 to 10-6 in which the anode electrical conductor was added, the discharge capacity retention ratio was higher than that of Example 1-1 and the like in which the anode electrical conductor was not added. The result showed that adding the anode electrical conductor was effective to improve the discharge capacity retention ratio.

However, in Comparative examples 10-1, 10-4, and 10-7 in which the anode electrical conductor was added but the anode structure 54B was not included, the discharge capacity retention ratio was significantly lower than that of Example 3-6 in which the anode electrical conductor was not added but the anode structure 54B was included. The result showed that though adding the anode electrical conductor contributed to improve the discharge capacity retention ratio, the improvement degree of the discharge capacity retention ratio obtained by adding the anode electrical conductor was far inferior to the improvement degree of the discharge capacity retention ratio obtained by using the anode structure 54B.

Accordingly, it was confirmed that in the secondary battery of the embodiment of the invention, in the case where the anode electrical conductor was added, the cycle characteristics were improved as well. It was also confirmed that in the case where the anode electrical conductor was added, the cycle characteristics were further improved. In particular, it was confirmed that in the secondary battery of the embodiment of the invention, in the case where the anode structure 54B in which the plurality of anode active material particles were held by the plurality of metal fibers forming the three-dimensional network structure was used, the cycle characteristics were more largely improved than in the case where the anode electrical conductor was simply added.

Examples 11-1 to 11-5

A procedure was performed in the same manner as that of Example 1-1, except that the firing temperature of the anode structure 54B was 500 deg C. (Example 11-1), 600 deg C. (Example 11-2), 700 deg C. (Example 11-3), 800 deg C. (Example 11-4), or 900 deg C. (Example 11-5).

The cycle characteristics for the secondary batteries of Examples 11-1 to 11-5 were examined. The results shown in Table 11 were obtained.

TABLE 11

| | Anode active material: silicon | | | | | | | |
|---|---|---|---|---|---|---|---|---|
| | Anode current collector | Metal fiber | | | Anode active material particles Median size (μm) | Anode binder | | Discharge capacity retention ratio (%) |
| | | Type | Diameter D (μm) | Ratio B/A | | Type | Firing temperature (deg C.) | |
| Example 1-1 | Cu | Fe | 15 | 15 | 5 | PI | 400 | 80 |
| Example 11-1 | | | | | | | 500 | 81 |
| Example 11-2 | | | | | | | 600 | 82 |
| Example 11-3 | | | | | | | 700 | 83 |
| Example 11-4 | | | | | | | 800 | 85 |
| Example 11-5 | | | | | | | 900 | 83 |
| Comparative example 1 | Cu | — | — | — | 5 | PI | — | 32 |

As shown in Table 11, in Examples 11-1 to 11-5 in which the firing temperature of the anode structure 54B was changed, the discharge capacity retention ratio was higher than that of Comparative example 1 as in Example 1-1 irrespective of a value of the firing temperature.

In particular, in Examples 1-1 and 11-1 to 11-5, there was a tendency that as the firing temperature was increased, the discharge capacity retention ratio was increased and then slightly decreased. In this case, when the firing temperature was 800 deg C. or less, as the firing temperature was increased, the discharge capacity retention ratio was increased. The result showed the following. The decomposition temperature of polyimide used as an anode binder is about 500 deg C. Thus, in the case where the firing temperature was higher than 400 deg C., carbonization degree of polyimide as an anode binder was increased, and accordingly the electric conductivity of the anode 54 was increased.

Accordingly, it was confirmed that in the secondary battery of the embodiment of the invention, in the case where the firing temperature of the anode structure 54B was changed, the cycle characteristics were improved as well. It was also confirmed that when the firing temperature was high, the characteristics were further improved.

Examples 12-1 to 12-9

A procedure was performed in the same manner as that of Example 1-1, except that the anode utilization was 10% (Example 12-1), 20% (Example 12-2), 30% (Example 12-3), 40% (Example 12-4), 60% (Example 12-5), 70% (Example 12-6), 80% (Example 12-7), 90% (Example 12-8), or 100% (Example 12-9). In changing the anode utilization, the ratio between the capacity of the cathode 53 and the capacity of the anode 54 was changed.

The cycle characteristics for the secondary batteries of Examples 12-1 to 12-9 were examined. The results shown in Table 12 and FIG. 17 were obtained.

For the secondary batteries of Examples 12-1 to 12-9, in addition to the cycle characteristics, the initial charge and discharge characteristics were examined. In examining the initial charge and discharge characteristics, first, to stabilize the battery state, after charge and discharge was performed 1 cycle in the atmosphere at 23 deg C., charge was performed again in the same atmosphere. Thereby, the charge capacity was measured. Subsequently, discharge was performed in the same atmosphere, and thereby the discharge capacity was measured. Finally, initial efficiency (%)=(discharge capacity/charge capacity)×100 was calculated. The charge and discharge conditions were as follows. That is, after charge was performed at the constant current density of 1 mA/cm$^2$ until the battery voltage reached 4.2 V and further charge was performed at the constant voltage of 4.2 V until the current value reached 0.05 mA, discharge was performed at the constant current density of 1 mA/cm$^2$ until the battery voltage reached 2.5 V.

TABLE 12

| | Anode active material: silicon | | | | | | | |
|---|---|---|---|---|---|---|---|---|
| | Anode current collector | Metal fiber | | | Anode active material particles Median size (μm) | Anode electrical conductor | Anode utilization (%) | Initial efficiency (%) | Discharge capacity retention ratio (%) |
| | | Type | Diameter D (μm) | Ratio B/A | | | | | |
| Example 12-1 | Cu | Fe | 15 | 15 | 5 | PI | 10 | 67 | 85 |
| Example 12-2 | | | | | | | 20 | 80 | 84 |
| Example 12-3 | | | | | | | 30 | 82 | 83 |
| Example 12-4 | | | | | | | 40 | 84 | 82 |
| Example 1-1 | | | | | | | 50 | 86 | 80 |
| Example 12-5 | | | | | | | 60 | 87 | 79 |
| Example 12-6 | | | | | | | 70 | 87 | 78 |
| Example 12-7 | | | | | | | 80 | 87 | 76 |
| Example 12-8 | | | | | | | 90 | 87 | 69 |
| Example 12-9 | | | | | | | 100 | 88 | 67 |
| Comparative example 1 | Cu | — | — | — | 5 | PI | 50 | 82 | 32 |

As shown in Table 12, in Examples 12-1 to 12-9 in which the anode utilization was changed, the discharge capacity retention ratio was higher than that of Comparative example 1 as in Examples 1-1 irrespective of a value of the anode utilization.

Figure 17:
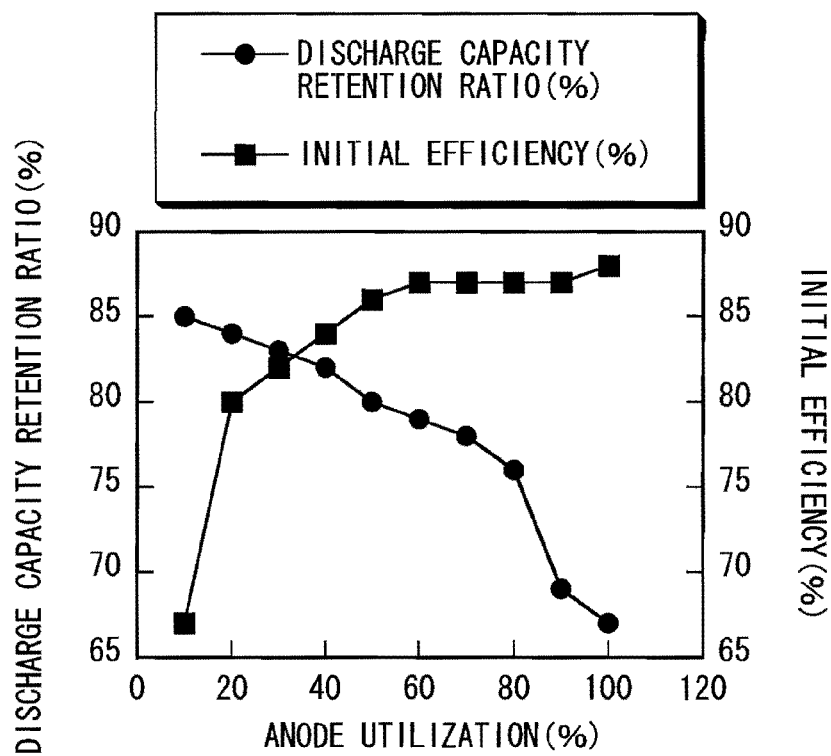
FIG. 17 is a diagram illustrating a correlation between an anode utilization and a discharge capacity retention ratio/ initial efficiency.

In particular, as shown in Table 12 and FIG. 17, as the anode utilization was increased, the discharge capacity retention ratio was modestly decreased and then rapidly decreased, and the initial efficiency was rapidly increased and then modestly increased. In this case, when the anode utilization was from 20% to 80% both inclusive, both the discharge capacity retention ratio and the initial efficiency were high, and a discharge capacity retention ratio of 70% or more and initial efficiency of 70% or more were obtained.

Accordingly, it was confirmed that in the secondary battery of the embodiment of the invention, in the case where the anode utilization was changed, the cycle characteristics were improved as well. It was also confirmed that when the anode utilization was from 20% to 80% both inclusive, sufficient initial charge and discharge characteristics were obtained.

Examples 13-1 to 13-4

A procedure was performed in the same manner as that of Example 1-1, except that the arithmetic average roughness Rz of the surface of the anode current collector 54A was changed to 0.05 μm (Example 13-1), 0.1 μm (Example 13-2), 0.3 μm (Example 13-3), or 0.4 μm (Example 13-4).

The cycle characteristics for the secondary batteries of Examples 13-1 to 13-4 were examined. The results shown in Table 13 and FIG. 18 were obtained.

TABLE 13

Anode active material: silicon

| | Anode current collector | | Metal fiber | | | Anode active material particles | | Discharge capacity |
|---|---|---|---|---|---|---|---|---|
| | Type | Arithmetic average roughness Ra (μm) | Type | Diameter D (μm) | Ratio B/A | Median size (μm) | Anode binder | retention ratio (%) |
| Example 13-1 | Cu | 0.05 | Fe | 15 | 15 | 5 | PI | 64 |
| Example 13-2 | | 0.1 | | | | | | 68 |
| Example 1-1 | | 0.2 | | | | | | 80 |
| Example 13-3 | | 0.3 | | | | | | 81 |
| Example 13-4 | | 0.4 | | | | | | 81 |
| Comparative example 1 | Cu | 0.2 | — | — | — | 5 | PI | 32 |

As shown in Table 13, in Examples 13-1 to 13-4 in which the arithmetic average roughness Ra of the surface of the anode current collector 54A was changed, the discharge capacity retention ratio was higher than that of Comparative example 1 as in Example 1-1 irrespective of a value of the arithmetic average roughness Ra.

Figure 18:
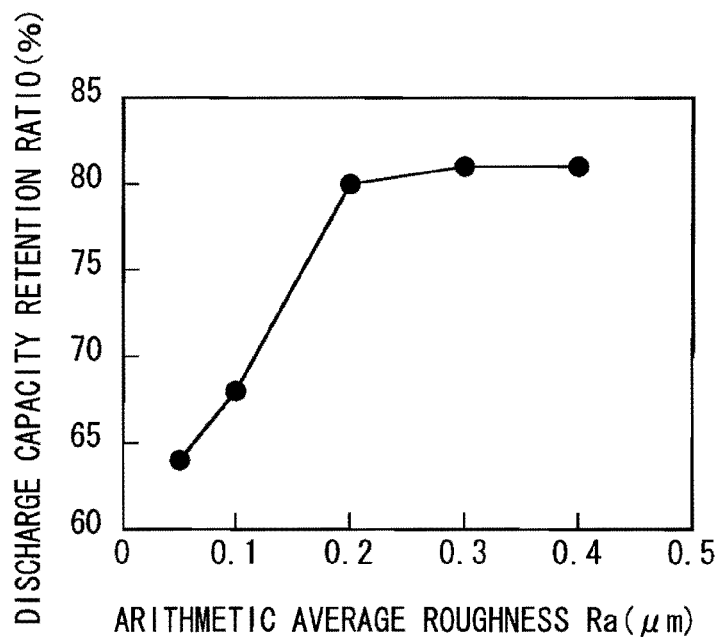
FIG. 18 is a diagram illustrating a correlation between arithmetic average roughness Ra and a discharge capacity retention ratio.

In particular, as shown in Table 13 and FIG. 18, in Examples 1-1 and 13-1 to 13-4, there was a tendency that as the arithmetic average roughness Ra was increased, the discharge capacity retention ratio was increased and then became constant. In that case, when the arithmetic average roughness Ra was 0.2 μm or more, the discharge capacity retention ratio was largely increased.

Accordingly, it was confirmed that in the secondary battery of the embodiment of the invention, in the case where the arithmetic average roughness Ra of the surface of the anode current collector 54A was changed, the cycle characteristics were improved as well. It was also confirmed that when the arithmetic average roughness Ra was 0.2 μm or more, the characteristics were further improved.

Examples 14-1 to 14-4

A procedure was performed in the same manner as that of Examples 2-6, 2-7, 1-1, and 2-8 except that the anode current collector 54A was not used, and the anode active material particles were formed by using dipping method. In forming the anode active material particles, the plurality of metal fibers formed into a sheet were prepared, and then the metal fibers were dipped in the anode mixture slurry, taken out, and then dried. Dipping was repeated until the amount of the anode active material particles became equal to that of Example 2-6 and the like.

The cycle characteristics for the secondary batteries of Examples 14-1 to 14-4 were examined. The results shown in Table 14 were obtained.

TABLE 14

Anode active material: silicon

| | Anode current collector | Metal fiber | | | Anode active material particles | Anode electrical conductor | Discharge capacity retention ratio (%) |
|---|---|---|---|---|---|---|---|
| | | Type | Diameter D (μm) | Ratio B/A | Median size (μm) | | |
| Example 2-6 | Cu | Fe | 5 | 15 | 5 | PI | 78 |
| Example 2-7 | | | 10 | | | | 79 |
| Example 1-1 | | | 15 | | | | 80 |
| Example 2-8 | | | 20 | | | | 81 |
| Example 14-1 | — | Fe | 5 | 15 | 5 | PI | 78 |
| Example 14-2 | | | 10 | | | | 79 |
| Example 14-3 | | | 15 | | | | 80 |
| Example 14-4 | | | 20 | | | | 81 |
| Comparative example 1 | Cu | — | — | — | 5 | PI | 32 |

As shown in Table 14, in Examples 14-1 to 14-4 in which the anode current collector 54A was not used, the discharge capacity retention ratio was higher than that of Comparative example 1 as in Example 2-6 and the like.

In particular, in the case where the discharge capacity retention ratio was compared between Example 2-6 and the like and Examples 14-1 to 14-4 for each value of the diameter D of the metal fibers, there was no difference. However, the number of spirally winding the spirally wound electrode body 50 in the case where the volume was constant in the case of not using the anode current collector 54A was larger than that in the case of using the anode current collector 54A. The result showed that in the case of not using the anode current collector 54A, the thickness of the anode 54 was thinner than that in the case of using the anode current collector 54A. Thus, in the case of not using the anode current collector 54A, the number of spirally winding the spirally wound electrode body 50 could be increased, and thus the battery capacity could be increased.

Accordingly, it was confirmed that in the secondary battery of the embodiment of the invention, the cycle characteristics were improved irrespective of presence of the anode current collector 54A. It was also confirmed that when the anode current collector 54A was not used, a high battery capacity was also obtained.

Example 15-1

A procedure was performed in the same manner as that of Example 1-1, except that as a solvent, 4-fluoro-1,3-dioxolane-2-one (FEC) as a cyclic ester carbonate having halogen represented by Chemical formula 2 was used instead of EC.

Example 15-2

A procedure was performed in the same manner as that of Example 15-1, except that lithium tetrafluoroborate (LiBF$_4$) as an electrolyte salt and sulfobenzoic anhydride (SBAH) represented by Chemical formula 18 as an acid anhydride were added. At that time, while the content of lithium hexafluorophosphate to the solvent was kept at 1 mol/kg, the content of lithium tetrafluoroborate to the solvent was 0.05 mol/kg. The additive amount of SBAH was 1 wt %. "1 wt %" was a ratio where the total of the solvent and SBAH was 100 wt %.

Example 15-3

A procedure was performed in the same manner as that of Example 15-2, except that as a solvent, propylene carbonate (PC) was added. The composition of the solvent (PC:FEC:DEC) was 20:30:50 at a weight ratio.

Example 15-4

A procedure was performed in the same manner as that of Example 15-3, except that as a solvent, 4,5-difluoro-1,3-dioxolane-2-one (DFEC) as a cyclic ester carbonate having halogen represented by Chemical formula 2 was added. At this time, the composition of the solvent (PC:FEC:DFEC:DEC) was 30:10:10:50 at a weight ratio.

Example 15-5

A procedure was performed in the same manner as that of Example 15-3, except that as a solvent, DFEC was used instead of FEC. The composition of the solvent (PC:DFEC:DEC) was 40:10:50 at a weight ratio.

The cycle characteristics for the secondary batteries of Examples 15-1 to 15-5 were examined. The results shown in Table 15 were obtained.

TABLE 15

Anode active material: silicon

| | | Metal fiber | | Anode active material particles | | | Electrolytic solution | | | | | | Discharge capacity retention ratio |
|---|---|---|---|---|---|---|---|---|---|---|---|---|---|
| | Anode current collector | Type | Diameter D (μm) | Ratio B/A | Median size (μm) | Anode binder | EC | PC | FEC | DFEC | DEC | Electrolyte salt | Other | (%) |
| | | | | | | | | | Solvent (wt %) | | | | | |
| Example 1-1 | Cu | Fe | 15 | 15 | 5 | PI | 50 | — | — | — | 50 | LiPF$_6$ | — | 80 |
| Example 15-1 | | | | | | | — | — | 50 | — | 50 | LiPF$_6$ | — | 81 |
| Example 15-2 | | | | | | | — | — | 50 | — | 50 | LiPF$_6$ + LiBF$_4$ | SBAH | 82 |
| Example 15-3 | | | | | | | — | 20 | 30 | — | 50 | LiPF$_6$ + LiBF$_4$ | SBAH | 83 |
| Example 15-4 | | | | | | | — | 30 | 10 | 10 | 50 | LiPF$_6$ + LiBF$_4$ | SBAH | 84 |
| Example 15-5 | | | | | | | — | 40 | — | 10 | 50 | LiPF$_6$ + LiBF$_4$ | SBAH | 85 |
| Comparative example 1 | Cu | — | — | — | 5 | PI | 50 | — | — | — | 50 | LiPF$_6$ | — | 32 |

As shown in Table 15, in Examples 15-1 to 15-5 in which other solvent (FEC or the like), other electrolyte salt (lithium tetrafluoroborate), or other additive (SBAH as an acid anhydride) was used, the discharge capacity retention ratio was higher than that of Comparative example 1 as in Example 1-1 irrespective of the solvent composition or the like.

In particular, in Examples 15-1 to 15-5 in which other solvent or the like was used, the discharge capacity retention ratio was higher than that of Example 1 in which other solvent or the like was not used. In that case, the discharge capacity retention ratio in the case of using DFEC was higher than that in the case of using FEC. The result showed that in the case of using the cyclic ester carbonate having halogen as a solvent, the higher the number of halogen was, the higher the discharge capacity retention ratio was.

No results in the case where the chain ester carbonate having halogen represented by Chemical formula 1 was used are herein shown. However, the chain ester carbonate having halogen represented by Chemical formula 1 fulfils a function in the same manner as the cyclic ester carbonate having halogen represented by Chemical formula 2 does. Thus, it is evident that in the case where the chain ester carbonate having halogen represented by Chemical formula 1 is used, similar effect is obtained as well. The same is applied to a case that lithium perchlorate, lithium hexafluoroarsenate, or the compound represented by Chemical formula 8 to Chemical formula 10 or Chemical formula 14 to Chemical formula 16 is used as an electrolyte salt, or a case that sultone is used as an additive.

Accordingly, it was confirmed that in the secondary battery of the embodiment of the invention, in the case where the solvent composition, the electrolyte salt type, or presence of an additive was changed, the cycle characteristics were improved as well. It was also confirmed that in the case where other solvent such as FEC, other electrolyte salt such as lithium tetrafluoroborate, or an additive such as an acid anhydride was used, the characteristics were further improved. Further, it was also confirmed that in the case where the chain ester carbonate having halogen or the cyclic ester carbonate having halogen was used, the higher the number of halogen was, the more the characteristics were improved.

Examples 16-1 to 16-8

A procedure was performed in the same manner as that of Example 14-1 except that the thickness of the plurality of metal fibers formed into a sheet was 5 μm (Example 16-1), 10 μm (Example 16-2), 20 μm (Example 16-3), 30 μm (Example 16-4), 50 μm (Example 16-5), 150 μm (Example 16-6), 200 μm (Example 16-7), or 250 μm (Example 16-8).

The cycle characteristics for the secondary batteries of Examples 16-1 to 16-8 were examined. The results shown in Table 16 were obtained.

In particular, in Examples 14-1 and 16-1 to 16-8, in the case where the thickness was changed, the discharge capacity retention ratio was almost constant. In this case, in the case where the thickness was from 10 μm to 200 μm both inclusive, a high battery capacity was obtained while the anode 54 was prevented from being fractured in charge and discharge.

Accordingly, it was confirmed that in the secondary battery of the embodiment of the invention, in the case where the plurality of metal fibers formed a sheet, if the thickness thereof was changed, the cycle characteristics were improved as well.

Examples 17-1 to 17-6

A procedure was performed in the same manner as that of Example 14-1 except that the porosity of the plurality of metal fibers formed into a sheet was 20% (Example 17-1), 25% (Example 17-2), 55% (Example 17-3), 70% (Example 17-4), 85% (Example 17-5), or 95% (Example 17-6).

TABLE 16

Anode active material: silicon

| | Anode current collector | Metal fiber | | | Anode active material particles | | Discharge capacity retention ratio (%) |
| --- | --- | --- | --- | --- | --- | --- | --- |
| | | Type | Diameter D (μm) | Ratio B/A | Thickness (μm) | Median size (μm) | Anode binder |  |
| Example 16-1 | — | Fe | 5 | 15 | 5 | 5 | PI | 78.2 |
| Example 16-2 | | | | | 10 | | | 78.3 |
| Example 16-3 | | | | | 20 | | | 78.1 |
| Example 16-4 | | | | | 30 | | | 78 |
| Example 16-5 | | | | | 50 | | | 78.2 |
| Example 14-1 | | | | | 100 | | | 78 |
| Example 16-6 | | | | | 150 | | | 78.1 |
| Example 16-7 | | | | | 200 | | | 78 |
| Example 16-8 | | | | | 250 | | | 78.1 |
| Comparative example 1 | Cu | — | — | — | — | 5 | PI | 32 |

As shown in Table 16, in Examples 16-1 to 16-8 in which the thickness of the sheet was changed, the discharge capacity retention ratio was higher than that of Comparative example 1 as in Example 14-1 irrespective of the thickness.

The cycle characteristics for the secondary batteries of Examples 17-1 to 17-6 were examined. The results shown in Table 17 were obtained.

TABLE 17

Anode active material: silicon

| | Anode current collector | Metal fiber | | | | Anode active material particles | | Discharge capacity retention ratio (%) |
| --- | --- | --- | --- | --- | --- | --- | --- | --- |
| | | Type | Diameter D (μm) | Ratio B/A | Porosity (%) | Median size (μm) | Anode binder | |
| Example 17-1 | — | Fe | 5 | 15 | 20 | 5 | PI | 79.3 |
| Example 17-2 | | | | | 25 | | | 78.5 |
| Example 14-1 | | | | | 40 | | | 78 |
| Example 17-3 | | | | | 55 | | | 77.8 |
| Example 17-4 | | | | | 70 | | | 77.6 |
| Example 17-5 | | | | | 85 | | | 77.5 |
| Example 17-6 | | | | | 95 | | | 77.4 |
| Comparative example 1 | Cu | — | — | — | — | 5 | PI | 32 |

As shown in Table 17, in Examples 17-1 to 17-6 in which the porosity of the sheet was changed, the discharge capacity retention ratio was higher than that of Comparative example 1 as in Example 14-1 irrespective of the porosity.

In particular, in Examples 14-1 and 17-1 to 17-6, in the case where the porosity was changed, the discharge capacity retention ratio was almost constant. In that case, in the case where the porosity was from 20% to 95% both inclusive, a high battery capacity was obtained while the plurality of metal fibers retained the sheet-like structure.

Accordingly, it was confirmed that in the secondary battery of the embodiment of the invention, in the case where the plurality of metal fibers structured a sheet, if the porosity thereof was changed, the cycle characteristics were improved as well.

Examples 18-1 to 18-13

A procedure was performed in the same manner as that of Example 14-1, except that the tensile strength of the plurality of metal fibers forming a sheet was 0.06 N/mm (Example 18-1), 0.1 N/mm (Example 18-2), 0.5 N/mm (Example 18-3), 1 N/mm (Example 18-4), 2 N/mm (Example 18-5), 8 N/mm (Example 18-6), 15 N/mm (Example 18-7), 25 N/mm (Example 18-8), 46 N/mm (Example 18-9), 61 N/mm (Example 18-10), 95 N/mm (Example 18-11), 143 N/mm (Example 18-12), or 168 N/mm (Example 18-13).

The cycle characteristics for the secondary batteries of Examples 18-1 to 18-13 were examined. The results shown in Table 18 and FIG. 19 were obtained.

For the secondary batteries of Examples 14-1 and 18-1 to 18-13, in addition to the cycle characteristics, safety (electrode exhaustion generation status) was examined. In examining the safety, after secondary batteries that had been examined on the cycle characteristics (101st charge and discharge had been completed) were decomposed, the anode 54 was taken out, and presence of electrode exhaust was visually examined. At that time, the number of measurement n was 100 pcs, and electrode exhaust generation ratio (%)=(number of exhaust generation/100 pcs)×100 was calculated.

As shown in Table 18, in Examples 18-1 to 18-13 in which the tensile strength of the sheet was changed, the discharge capacity retention ratio was higher than that of Comparative example 1 as in Example 14-1 irrespective of the tensile strength.

Figure 19:
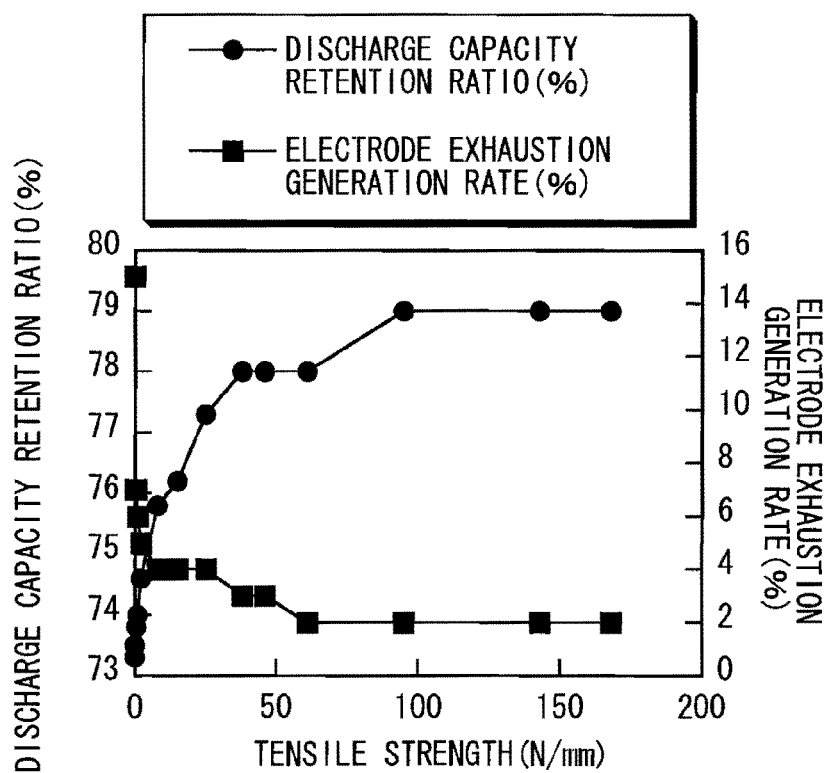
FIG. 19 is a diagram illustrating a correlation between a tensile strength and a discharge capacity retention ratio/ electrode exhaustion generation rate.

In particular, as shown in Table 18 and FIG. 19, in Examples 14-1 and 18-1 to 18-13, there was a tendency that as the tensile strength was increased, the discharge capacity retention ratio was increased and then became almost constant; and the electrode exhaustion generation rate was rapidly decreased and then became almost constant. In that case, when the tensile strength was 0.1 N/mm or more, the electrode exhaustion generation rate became almost minimum while a high discharge capacity retention ratio was maintained.

Accordingly, it was confirmed that in the secondary battery of the embodiment of the invention, in the case where the plurality of metal fibers formed a sheet, if the tensile strength thereof was changed, the cycle characteristics were improved as well. It was also confirmed that in the case where the tensile strength was 0.1 N/mm or more, high safety was obtained.

As evidenced by the foregoing results of Table 1 to Table 18 and FIG. 11 to FIG. 19, in the secondary battery of the embodiment of the invention, since the anode contained the plurality of metal fibers forming the three-dimensional network structure and the plurality of anode active material particles having silicon, the cycle characteristics were improved irrespective of the structural parameters of the metal fibers (diameter D, ratio B/A, and ratio Y/X); the thickness, the porosity, and the tensile strength in the case where the plurality of metal fibers formed the sheet; the median size and the formation method of the anode active material particles; the type of the anode binder; presence of the anode current collector and the like. In particular, from the result that the cycle characteristics were improved irrespective of presence of the anode current collector, it was confirmed that not only the cycle characteristics but also the battery capacity was improved if the anode current collector was not used.

The invention has been described with reference to the embodiment and the examples. However, the invention is

TABLE 18

| | | Anode active material: silicon | | | | | | |
|---|---|---|---|---|---|---|---|---|
| | | Metal fiber | | | Anode active material | | | |
| | Anode current collector | Type | Diameter D (μm) | Ratio B/A | Tensile strength (N/mm) | particles Median size (μm) | Anode binder | Discharge capacity retention ratio (%) | Electrode exhaust generation ratio (%) |
| Example 18-1 | Cu | Fe | 15 | 15 | 0.06 | 5 | PI | 73.3 | 15 |
| Example 18-2 | | | | | 0.1 | | | 73.5 | 7 |
| Example 18-3 | | | | | 0.5 | | | 73.8 | 7 |
| Example 18-4 | | | | | 1 | | | 74 | 6 |
| Example 18-5 | | | | | 2 | | | 74.6 | 5 |
| Example 18-6 | | | | | 8 | | | 75.8 | 4 |
| Example 18-7 | | | | | 15 | | | 76.2 | 4 |
| Example 18-8 | | | | | 25 | | | 77.3 | 4 |
| Example 14-1 | | | | | 38 | | | 78 | 3 |
| Example 18-9 | | | | | 46 | | | 78 | 3 |
| Example 18-10 | | | | | 61 | | | 78 | 2 |
| Example 18-11 | | | | | 95 | | | 79 | 2 |
| Example 18-12 | | | | | 143 | | | 79 | 2 |
| Example 18-13 | | | | | 168 | | | 79 | 2 |
| Comparative example 1 | Cu | — | — | — | — | 5 | PI | 32 | 2 | not limited to the aspects described in the foregoing embodiment and the foregoing examples, and various modifications may be made. For example, use application of the anode of the invention is not limited to the secondary battery, but may be an electrochemical device other than the secondary battery. Examples of other use applications include a capacitor and the like.

Further, in the foregoing embodiment and the foregoing examples, the description has been given of the lithium ion secondary battery in which the anode capacity is expressed based on insertion and extraction of lithium. However, the secondary battery of the invention is not limited thereto. The invention is similarly applicable to a secondary battery in which the anode capacity includes the capacity associated with insertion and extraction of lithium and the capacity associated with precipitation and dissolution of lithium, and the anode capacity is expressed by the sum of these capacities. In this secondary battery, a material capable of inserting and extracting lithium is used as an anode active material, and the chargeable capacity in the anode material capable of inserting and extracting lithium is set to a smaller value than that of the discharge capacity of the cathode.

Further, in the foregoing embodiment and the foregoing examples, the description has been given with the specific examples of the case in which the battery structure is the square type, the cylindrical type, or the laminated film type, and with the specific example in which the battery element has the spirally wound structure. However, the secondary battery of the invention is similarly applicable to a battery having other battery structure such as a coin type battery and a button type battery or a battery in which the battery element has other structure such as a lamination structure.

Further, in the foregoing embodiment and the foregoing examples, the description has been given of the case using lithium as an electrode reactant. However, as an electrode reactant, other Group 1 element such as sodium (Na) and potassium (K), a Group 2 element such as magnesium (Mg) and calcium (Ca), or other light metal such as aluminum may be used.

Further, in the foregoing embodiment and the foregoing examples, for the anode and the secondary battery of the invention, as appropriate ranges, the description has been given of the numerical values derived from the results of the examples for the structural parameters of the metal fibers (diameter D, ratio B/A, and ratio Y/X). However, the description does not totally deny a possibility that the structural parameters are out of the foregoing ranges. That is, the foregoing appropriate ranges are the range particularly preferable for obtaining the effects of the invention. Therefore, as long as effect of the invention is obtained, the structural parameters may be out of the foregoing ranges in some degrees. The same is applied to the thickness, the porosity, and the tensile strength in the case where the plurality of metal fibers form the sheet; the median size of the anode active material particles; and the arithmetic average roughness Ra of the surface of the anode current collector.

The present application contains subject matter related to that disclosed in Japanese Priority Patent Application JP 2008-112661 filed in the Japanese Patent Office on Apr. 23, 2008, the entire content of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. A secondary battery comprising:
a cathode;
an anode comprising (i) a plurality of metal fibers forming a conductive three-dimensional network structure, (ii) a resin binder securing the metal fibers in a sheet structure, and (iii) a plurality of anode active material particles having silicon (Si) at least a portion of which are contained within the three-dimensional network structure and which contact the metal fibers, and
an electrolytic solution,
wherein,
the sheet structure is uncompressed,
at least part of the resin binder is carbonized,
the metal fibers function as a current collector,
the anode, cathode and electrolytic solution are wound together and form a wound structure, each of the cathode and anode are elongated structures that extend along an anode-extending direction, where the anode-extending direction of the anode is defined by a length of the anode that is longer than a width of the anode,
the plurality of metal fibers (i) do not form an intermetallic compound with an electrode reactant, (ii) have a diameter D from 1 μm to 15 μm, both inclusive, and (iii) have a ratio B/A between average cross sectional diameter A and average length B of the metal fibers is 2 or more, at least some of the metal fibers extend more along the anode-extending direction than orthogonal to the anode-extending direction to form a conductive path along the anode-extending direction, these metal fibers being such that when each is divided into a component in the extending direction and a component in a direction orthogonal to the extending direction in a cross section along the extending direction of the anode, ratio Y/X between dimension X of the component in the extending direction and dimension Y of the component in the direction orthogonal to the extending direction is less than 1,
an amount of the anode active material particles contained within the three-dimensional network structure is greater than an amount of the anode active material particles located on a surface of the three-dimensional network structure or in a vicinity of the surface of the three-dimensional network structure,
the anode active material particles have a median diameter of 0.1 μm to 30 μm, both inclusive, and
the sheet structure has (i) a thickness from 10 μm to 200 μm, both inclusive, (ii) a porosity from 20% to 95% both inclusive, and (iii) a tensile strength of 0.1 N/mm or more.

2. The secondary battery according to claim 1, wherein the plurality of metal fibers are connected to each other at least partially and thereby forming the three-dimensional network structure.

3. The secondary battery according to claim 1, wherein the metal fibers are at least one selected from the group consisting of titanium (Ti), iron (Fe), stainless, copper (Cu), aluminum (Al), zinc (Zn), silver (Ag), cobalt (Co), nickel (Ni), and chromium (Cr).

4. The secondary battery according to claim 1, wherein diameter D of the metal fibers is from 2 μm to 10 μm.

5. The secondary battery according to claim 1, wherein the plurality of metal fibers form a sheet.

6. The secondary battery according to claim 1, wherein the anode active material particles are a simple substance of silicon, a compound of silicon, an alloy of silicon, or any combination of them.

7. The secondary battery according to claim 1, wherein a median size of the anode active material particles is from 1 μm to 20 μm both inclusive.

8. The secondary battery according to claim 1, wherein the binder contains at least one resin selected from the group consisting of polyimide, polyamide, and polyamideimide.

9. The secondary battery according to claim 1, wherein the anode contains an anode electrical conductor containing a carbon material.

10. The secondary battery according to claim 1, wherein the anode includes an anode current collector and an arithmetic average roughness Ra of a surface of the anode current collector is 0.2 μm or more.

11. The secondary battery according to claim 1, wherein the electrolytic solution contains a solvent containing at least one of a chain ester carbonate having halogen represented by Chemical formula 1, a cyclic ester carbonate having halogen represented by Chemical formula 2, a cyclic ester carbonate having an unsaturated bond represented by Chemical formula 3 to Chemical formula 5, sultone, and an acid anhydride:

Chemical formula 1

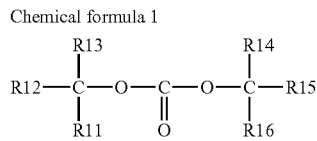

where R11 to R16 are a hydrogen group, a halogen group, an alkyl group, or an alkyl halide group, and at least one of R11 to R16 is the halogen group or the alkyl halide group;

Chemical formula 2

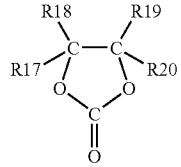

where R17 to R20 are a hydrogen group, a halogen group, an alkyl group, or an alkyl halide group, and at least one of R17 to R20 is the halogen group or the alkyl halide group;

Chemical formula 3

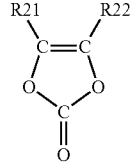

where R21 and R22 are a hydrogen group or an alkyl group;

Chemical formula 4

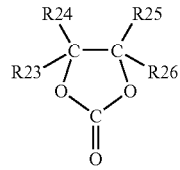

where R23 to R26 are a hydrogen group, an alkyl group, a vinyl group, or an aryl group, and at least one of R23 to R26 is the vinyl group or the aryl group;

Chemical formula 5

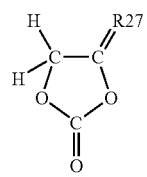

where R27 is an alkylene group.

12. The secondary battery according to claim 11, wherein the chain ester carbonate having halogen represented by the Chemical formula 1 is fluoromethyl methyl carbonate, difluoromethyl methyl carbonate, or bis(fluoromethyl) carbonate, the cyclic ester carbonate having halogen represented by the Chemical formula 2 is 4-fluoro-1,3-dioxolane-2-one or 4,5-difluoro-1,3-dioxolane-2-one, the cyclic ester carbonate having an unsaturated bond represented by the Chemical formula 3 is vinylene carbonate, the cyclic ester carbonate having an unsaturated bond represented by the Chemical formula 4 is vinylethylene carbonate, and the cyclic ester carbonate having an unsaturated bond represented by the Chemical formula 5 is methylene ethylene carbonate.

13. The secondary battery according to claim 1, wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), compounds represented by Chemical formula 6 to Chemical formula 8, and compounds represented by Chemical formula 9 to Chemical formula 11:

Chemical formula 6

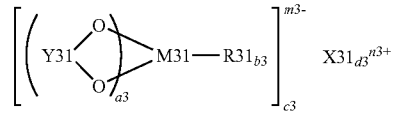

where X31 is a Group 1 element or a Group 2 element in the long period periodic table or aluminum (Al), M31 is a transition metal element, a Group 13 element, a Group 14 element, or a Group 15 element in the long period periodic table, R31 is a halogen group, Y31 is —(O=)C—R32-C(=O)—, —(O=)C—C(R33)$_2$-, or —(O=)C—C(=O)—, R32 is an alkylene group, an alkylene halide group, an arylene group, or an arylene halide group, R33 is an alkyl group, an alkyl halide group, an aryl group, or an aryl halide group, a3 is one of integer numbers 1 to 4, b3 is 0, 2, or 4, and c3, d3, m3, and n3 are one of integer numbers 1 to 3;

Chemical formula 7

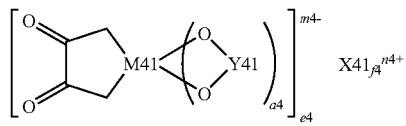

where X41 is a Group 1 element or a Group 2 element in the long period periodic table, M41 is a transition metal element, a Group 13 element, a Group 14 element, or a Group 15 element in the long period periodic table, Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—, R41 and R43 are a hydrogen group, an alkyl group, a halogen group, or an alkyl halide group, at least one of R41 and R43 is respectively the halogen group or the alkyl halide group, R42 is a hydrogen group, an alkyl group, a halogen group, or an alkyl halide group, a4, e4, and n4 are 1 or 2, b4 and d4 are one of integer numbers 1 to 4, c4 is one of integer numbers 0 to 4, and f4 and m4 are one of integer numbers 1 to 3;

Chemical formula 8

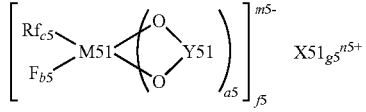

where X51 is a Group 1 element or a Group 2 element in the long period periodic table, M51 is a transition metal element, a Group 13 element, a Group 14 element, or a Group 15 element in the long period periodic table, Rf is a fluorinated alkyl group with the carbon number from 1 to 10 both inclusive or a fluorinated aryl group with the carbon number from 1 to 10 both inclusive, Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$-, —(R52)$_2$C—(C(R51)$_2$)$_{d5}$-S(=O)$_2$—, —(O=)$_2$S—(C(R51)$_2$)$_{e5}$-S(=O)$_2$—, or —(O=)C—(C(R51)$_2$)$_{e5}$-S(=O)$_2$—, R51 is a hydrogen group, an alkyl group, a halogen group, or an alkyl halide group, R52 is a hydrogen group, an alkyl group, a halogen group, or an alkyl halide group, and at least one thereof is the halogen group or the alkyl halide group, a5, f5, and n5 are 1 or 2, b5, c5, and e5 are one of integer numbers 1 to 4, d5 is one of integer numbers 0 to 4, and g5 and m5 are one of integer numbers 1 to 3;

LiN(C$_m$F$_{2m+1}$SO$_2$)(C$_n$F$_{2n+1}$SO$_2$)    Chemical formula 9 where m and n are an integer number of 1 or more;

Chemical formula 10

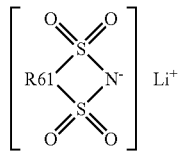

where R61 is a straight chain or branched perfluoro alkylene group with the carbon number from 2 to 4 both inclusive;

LiC(C$_p$F$_{2p+1}$SO$_2$)(C$_q$F$_{2q+1}$SO$_2$)(C$_r$F$_{2r+1}$SO$_2$)    Chemical formula 11 where p, q, and r are an integer number of 1 or more.

14. The secondary battery according to claim 13, wherein the compound represented by the Chemical formula 6 is a compound represented by Chemical formulas 12(1) to 12(6), the compound represented by the Chemical formula 7 is a compound represented by Chemical formulas 13(1) to 13(8), and the compound represented by the Chemical formula 8 is a compound represented by Chemical formula 14

Chemical formula 12

(1)

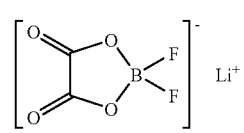

(2)

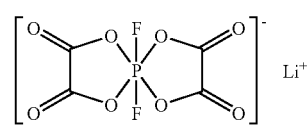

(3)

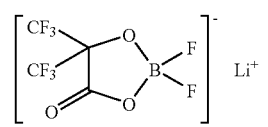

(4)

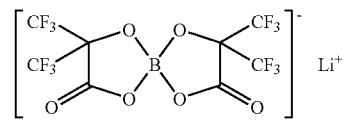

(5)

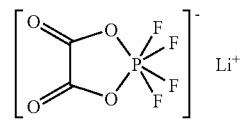

(6)

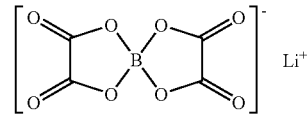

Chemical formula 13

(1)

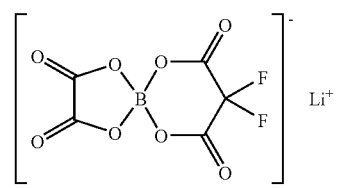

(2)

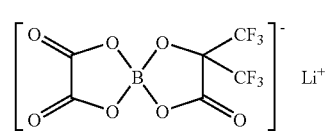

-continued

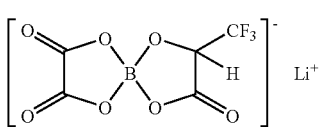 (3)

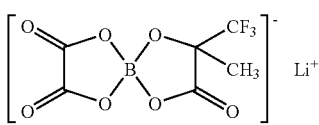 (4)

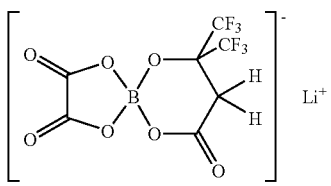 (5)

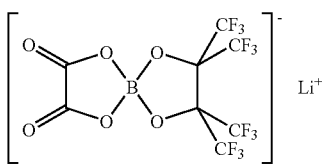 (6)

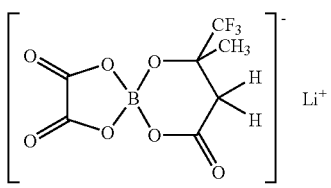 (7)

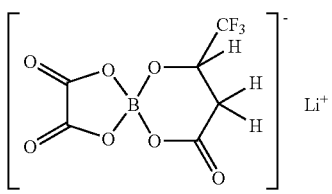 (8)

Chemical formula 14

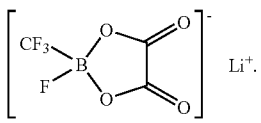

15. The secondary battery according to claim 1, wherein where anode utilization C(=(V1/V2)×100: %) is from 20% to 80% both inclusive where an insertion amount of an electrode reactant per unit area in the full charge state of the anode is V1 and an insertion amount of the electrode reactant capable of being electrochemically inserted into the anode per unit area is V2.

16. The secondary battery of claim 1, wherein the metal fibers forming a three-dimensional network structure serve as the anode current collector and there is no separate structure serving as the anode current collector.

17. The secondary battery of claim 1, wherein the anode active material particles include compounds of Si and one or more of Fe, Co, Ni, Ti, or Cu.

18. An anode comprising a plurality of metal fibers forming a conductive three-dimensional network structure, a carbonized resin binder securing the metal fibers in a sheet structure, and a plurality of anode active material particles having silicon (Si), at least some of which are contained within the three dimensional network structure and which contact the metal fibers, wherein:
   (a) the metal fibers function as a current collector,
   (b) the anode is an elongated structure that extends along an anode-extending direction, where the anode-extending direction of the anode is defined by a length of the anode that is longer than a width of the anode, and is capable of being wound,
   (c) the metal fibers (i) do not form an intermetallic compound with an electrode reactant, (ii) have a diameter D from 1 μm to 15 μm, both inclusive, and (iii) have a ratio B/A between average cross sectional diameter A and average length B of the metal fibers is 2 or more,
   (d) an amount of anode active material particles contained within the three-dimensional network structure is greater than an amount of anode active material particles located on a surface of the three-dimensional network structure or in a vicinity of the surface of the three-dimensional network structure,
   (e) at least some of the plurality of metal fibers extend in a length direction more along an the anode-extending direction than orthogonal to the anode-extending direction to form a conductive path along the anode-extending direction, these metal fibers being such that when each is divided into a component in the extending direction and a component in a direction orthogonal to the extending direction in a cross section along the extending direction of the anode, ratio Y/X between dimension X of the component in the extending direction and dimension Y of the component in the direction orthogonal to the extending direction is less than 1,
   (f) the particles have a median diameter of 0.1 μm to 30 μm, both inclusive,
   (g) the sheet structure has (i) a thickness from 10 μm to 200 μm, both inclusive, (ii) a porosity from 20% to 95% both inclusive, and (iii) a tensile strength of the sheet is 0.1 N/mm or more l(h) the sheet structure is uncompressed.

19. The anode of claim 18, wherein the metal fibers forming a three-dimensional network structure serve as the anode current collector and there is no separate structure serving as the anode current collector.

* * * * *